US012674737B2

(12) United States Patent
Rashedi

(10) Patent No.: US 12,674,737 B2
(45) Date of Patent: Jul. 7, 2026

(54) METHOD AND SYSTEM FOR DETECTION OF PARTICLES FOCUSED ASYMMETRICALLY

(71) Applicant: Bio-Rad Laboratories, Inc., Hercules, CA (US)

(72) Inventor: Ahmadreza Rashedi, Pleasanton, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 539 days.

(21) Appl. No.: 18/317,815

(22) Filed: May 15, 2023

(65) Prior Publication Data

US 2023/0366802 A1 Nov. 16, 2023

Related U.S. Application Data

(60) Provisional application No. 63/341,939, filed on May 13, 2022.

(51) Int. Cl.
| | |
|---|---|
| *G01N 15/1404* | (2024.01) |
| *G01N 15/01* | (2024.01) |
| *G01N 15/06* | (2024.01) |
| *G01N 15/075* | (2024.01) |
| *G01N 15/14* | (2024.01) |

(52) U.S. Cl.
CPC ..... *G01N 15/1404* (2013.01); *G01N 15/0625* (2013.01); *G01N 15/1459* (2013.01); *G01N 15/01* (2024.01); *G01N 15/075* (2024.01); *G01N 2015/1493* (2013.01)

(58) Field of Classification Search
CPC ........... G01N 15/1404; G01N 15/6025; G01N 15/1459; G01N 15/075; G01N 15/01; G01N 2015/1493; G01N 2015/003; G01N 2015/1006; G01N 2015/1413; G01N 2015/1415
See application file for complete search history.

(56) References Cited

U.S. PATENT DOCUMENTS

| | | |
|---|---|---|
| 2013/0086980 A1 | 4/2013 | Gadini et al. |
| 2018/0024041 A1 | 1/2018 | Wagner et al. |
| 2020/0141860 A1 | 5/2020 | Kaduchak et al. |
| (Continued) | | |

OTHER PUBLICATIONS

Lee, Gwo-Bin et al., "The hydrodynamic focusing effect inside rectangular microchannels", Journal of Micromechanics and Microengineering, vol. 16, Apr. 7, 2006, pp. 1024-1032.
(Continued)

*Primary Examiner* — Kathryn Elizabeth Limbaugh
(74) *Attorney, Agent, or Firm* — Kolisch Hartwell, P.C.

(57) ABSTRACT
Methods and systems for detecting particles. In an exemplary method, a sample fluid including the particles may be driven from a sample inlet channel, through a confluence region, and into a sample outlet channel defining a longitudinal axis. Focusing fluid may be introduced into the confluence region from at least two focusing channels along respective introduction axes. Introducing may be rotationally asymmetrical about the longitudinal axis. The introduction axes and the longitudinal axis may collectively extend in three dimensions. The particles may be passed through an interrogation zone of the sample outlet channel. The interrogation zone may be irradiated with light. Optical radiation may be detected from the interrogation zone.

19 Claims, 22 Drawing Sheets

(56)             References Cited

U.S. PATENT DOCUMENTS

| | | |
|---|---|---|
| 2021/0302300 A1 | 9/2021 | Cooksey et al. |
| 2021/0341376 A1 | 11/2021 | Di Carlo et al. |

OTHER PUBLICATIONS

Lee, Gwo-Bin et al., "Micromachined pre-focused 1 × N flow switches for continuous sample injection", Journal of Micromechanics and Microengineering, vol. 11, Aug. 9, 2001, pp. 567-573.
Rodriguez, Kari, Authorized Officer, ISA/US, Commissioner for Patents, "International Search Report" in connection with related International Application No. PCT/US2023/022279, dated Aug. 29, 2023, 9 pgs.
Rodriguez, Kari, Authorized Officer, ISA/US, Commissioner for Patents, "Written Opinion of the International Searching Authority" in connection with related International Application No. PCT/US2023/022279, dated Aug. 29, 2023, 5 pgs.

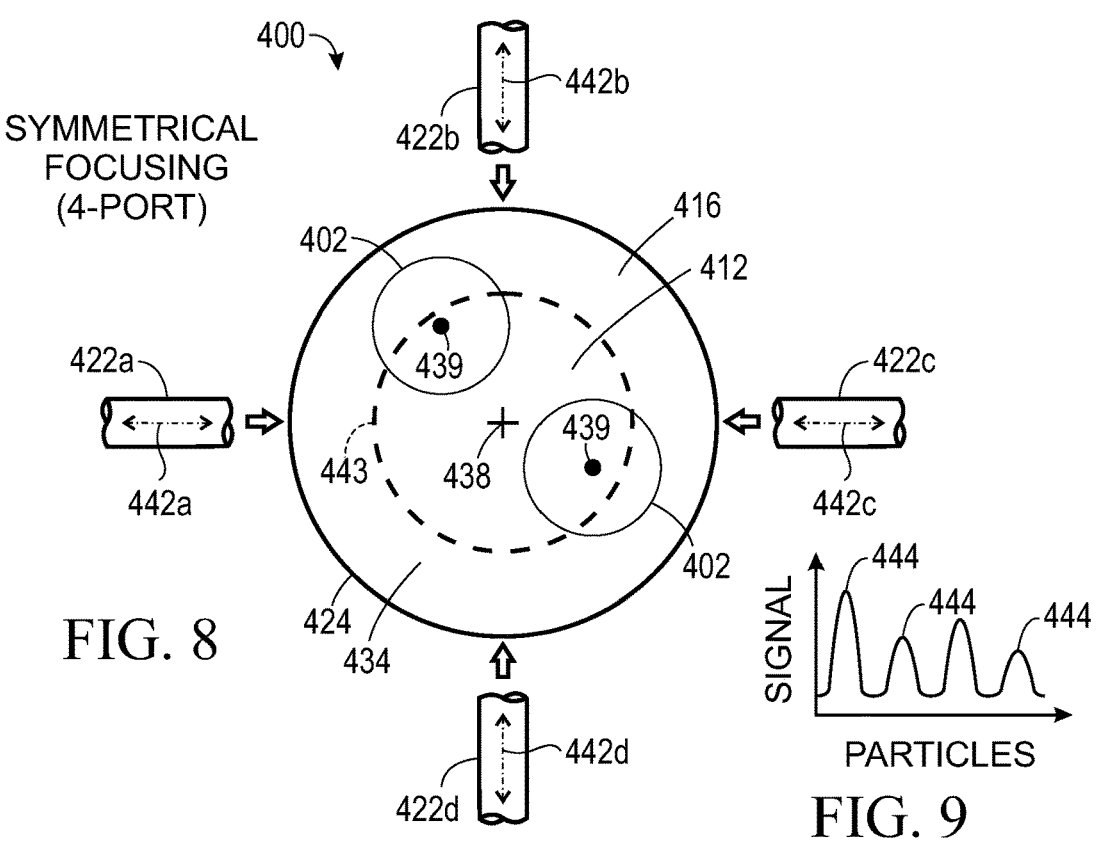
FIG. 8
FIG. 9
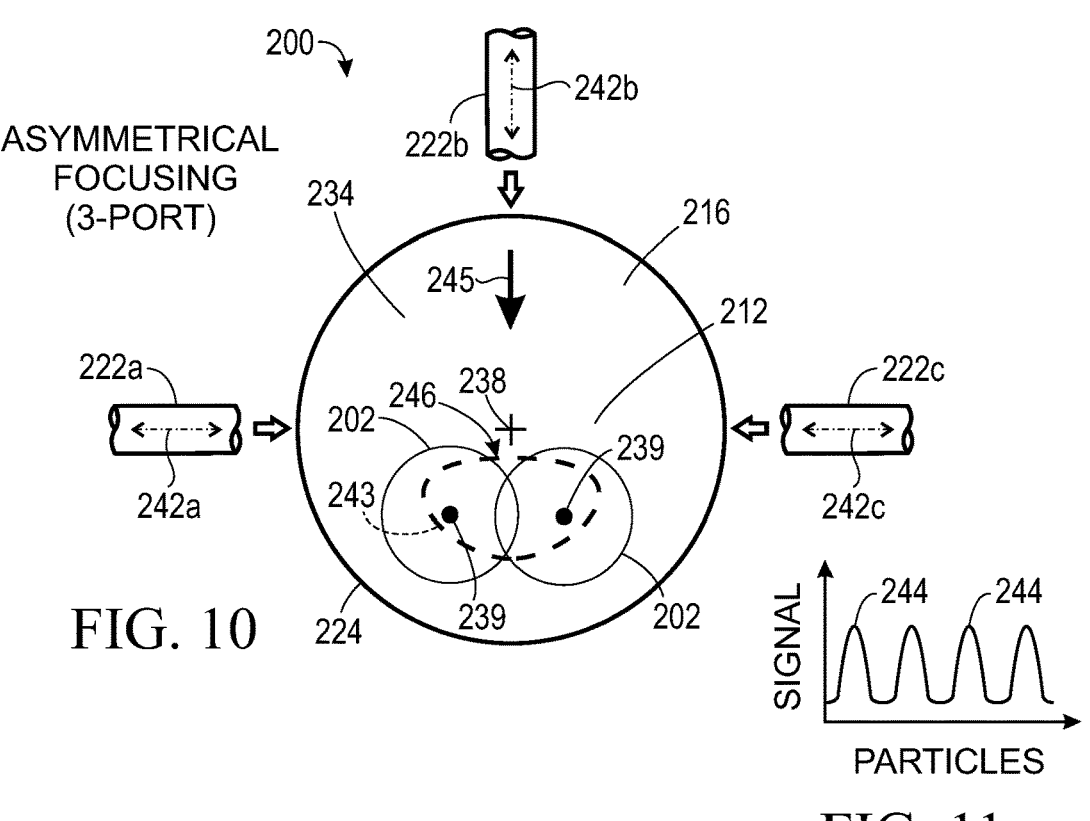
FIG. 10
FIG. 11

ASYMMETRICAL
FOCUSING
(2-PORT)

SIGNAL

PARTICLES

METHOD AND SYSTEM FOR DETECTION OF PARTICLES FOCUSED ASYMMETRICALLY

CROSS-REFERENCE TO PRIORITY APPLICATION

This application is based upon and claims the benefit under 35 U.S.C. § 119(e) of U.S. Provisional Patent Application Ser. No. 63/341,939, filed May 13, 2022, which is incorporated herein by reference in its entirety for all purposes.

INTRODUCTION

A microfluidic approach is often used to examine individual particles, such as droplets or biological cells. In this approach, a sample stream containing a set of particles is combined with one or more streams of a sheath fluid under conditions of laminar flow. The sheath fluid is configured to arrange the particles in single file by creating a fluid sheath around the sample stream. The fluid sheath squeezes the sample stream, which causes the sample stream to converge on an axis, while spreading the particles out along the axis. Once spread out, the particles can be optically interrogated serially with minimal interference from one another. For example, a fluorophore associated with the particles can be excited by irradiation with excitation light, to allow detection of fluorescence induced by the excitation.

The degree of alignment of the particles with one another can affect the consistency of particle irradiation and thus the accuracy/reproducibility of particle interrogation. If the particles are well-aligned, remaining centered on the same axis as the particles pass through an irradiation zone, the particles can be irradiated uniformly. If instead the centers of the particles are significantly and variably spaced from the axis, irradiation may be inconsistent and particle interrogation less reliable. Methods and systems to improve particle alignment and optical interrogation are needed.

SUMMARY

The present disclosure provides methods and systems for detecting particles. In an exemplary method, a sample fluid including the particles may be driven from a sample inlet channel, through a confluence region, and into a sample outlet channel defining a longitudinal axis. Focusing fluid may be introduced into the confluence region from at least two focusing channels along respective introduction axes. Introducing may be rotationally asymmetrical about the longitudinal axis. The introduction axes and the longitudinal axis may collectively extend in three dimensions. The particles may be passed through an interrogation zone of the sample outlet channel. The interrogation zone may be irradiated with light. Optical radiation may be detected from the interrogation zone.

BRIEF DESCRIPTION OF THE DRAWINGS

FIG. 8 is a fragmentary schematic view of an illustrative detection system in which focusing fluid is introduced symmetrically (instead of asymmetrically) into a confluence region at four ports, taken downstream of the confluence region through an interrogation zone of a sample outlet channel, orthogonal to a longitudinal axis of the sample outlet channel, and indicating a particle localization zone (in dashed outline) that is relatively wide and centered on the longitudinal axis.

FIG. 9 is a graph of a signal that may be detected from identical particles passing serially through the interrogation zone of FIG. 8 and illustrating variation in signal amplitude measured from the identical particles due to the width of the particle localization zone.

FIG. 10 is a fragmentary schematic view of the detection system of FIG. 2, taken as in FIG. 8 through an interrogation zone of a sample outlet channel, and indicating an off-axis particle localization zone (in dashed outline) that is radially offset from the longitudinal axis of the sample outlet channel and significantly narrower than the wide particle localization zone shown in FIG. 8, due to the rotationally asymmetrical introduction of focusing fluid at three ports.

FIG. 11 is a graph of a signal that may be detected from identical particles passing through the interrogation zone of FIG. 10 and illustrating a more consistent signal amplitude measured from the identical particles (relative to FIG. 9) due to the narrower particle localization zone.

DETAILED DESCRIPTION

Figure 1:
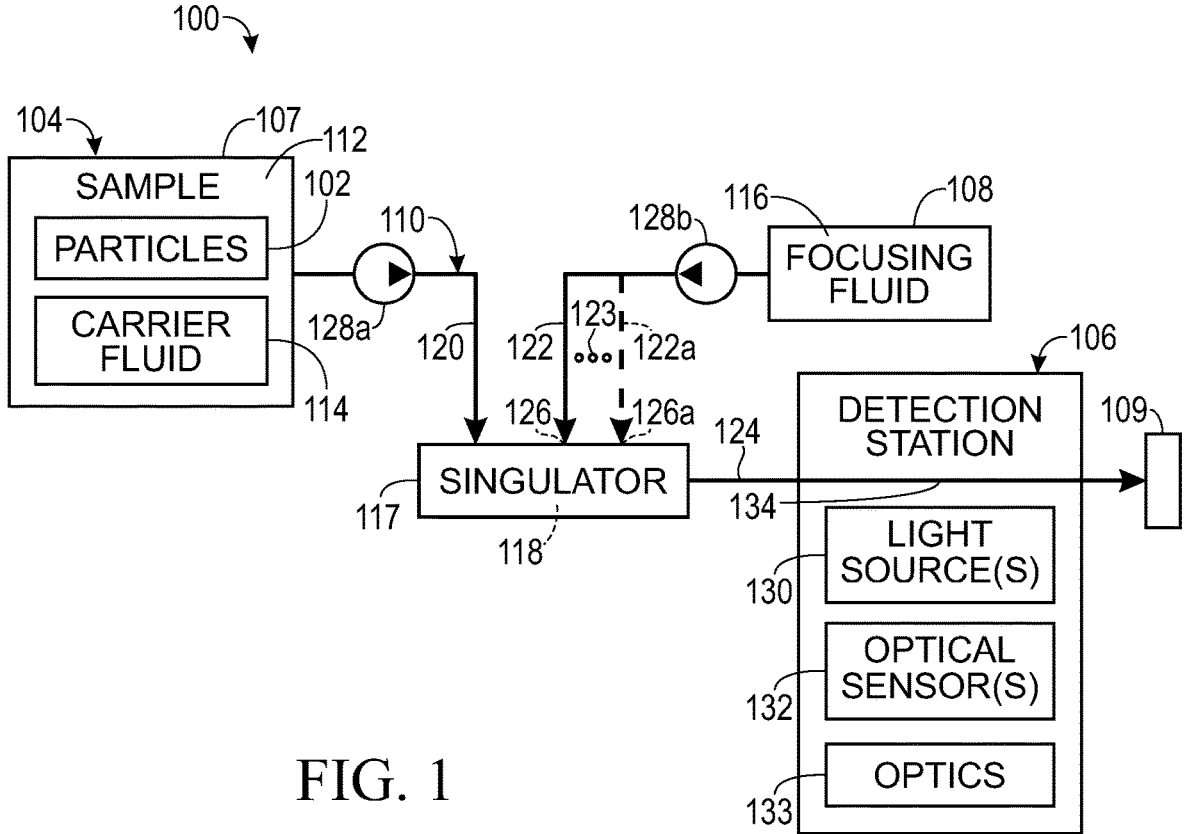
FIG. 1 is a schematic diagram of a detection system for particles, where the particles are focused off-axis by asymmetric introduction of focusing fluid.

Various aspects and examples of methods and systems for detecting particles are described below and illustrated in the associated drawings. Unless otherwise specified, the methods and systems may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar methods and systems, including being interchangeable between disclosed examples. The following description of various examples is merely illustrative in nature and is in no way intended to limit the examples, their applications, or their uses. Additionally, the advantages provided by the examples described below are illustrative in nature and not all examples provide the same advantages or the same degree of advantage.

The present disclosure provides methods and systems for detecting particles. In an exemplary method, a sample fluid including the particles may be driven from a sample inlet channel, through a confluence region, and into a sample outlet channel defining a longitudinal axis. Focusing fluid may be introduced into the confluence region from at least two focusing channels along respective introduction axes. Introducing may be rotationally asymmetrical about the longitudinal axis. The introduction axes and the longitudinal axis may collectively extend in three dimensions. The particles may be passed through an interrogation zone of the sample outlet channel. The interrogation zone may be irradiated with light. Optical radiation may be detected from the interrogation zone.

Further aspects of the present disclosure are described in the following sections: (I) definitions, (II) overview, (III) examples, components, and alternatives, (IV) illustrative combinations and additional examples, (V) advantages and benefits, and (VI) conclusion.

Features, functions, and advantages may be achieved independently in various examples of the present disclosure, or may be combined in yet other examples, further details of which can be seen with reference to the following description and drawings.

I. Definitions

Technical terms used in this disclosure have meanings that are commonly recognized by those skilled in the art. However, the following terms may be further defined as follows.

The term "asymmetrical" as used herein means lacking rotational symmetry about a designated axis.

A "carrier fluid" is a bulk fluid for enclosing and transporting particles. The bulk fluid may be liquid or gas. In some examples, the carrier fluid may be described as a continuous phase and the particles therein as a dispersed phase. The carrier fluid may be immiscible with, and may encapsulate, each particle. In some examples, the carrier fluid may be an oil, such as including a fluorocarbon oil or a silicone oil. In other examples, the carrier fluid may be aqueous.

A "channel" is a passage for fluid to flow through. A channel may be elongated to define a longitudinal axis along which the fluid flows. The longitudinal axis of the channel may be linear, curved, angular, or a combination thereof, among others. The channel may have any suitable cross-sectional shape, such as circular, semi-circular, elliptical, polygonal, or the like. The cross-sectional shape may be uniform or may vary along the longitudinal axis of the channel. The channel has a diameter measured orthogonally to the longitudinal axis. The diameter may vary or may remain constant along the longitudinal axis.

A "channel network" is a set of three or more channels that are fluidically connected to one another to define two or more different paths for fluid flow at one or more channel junctions.

"Comprising," "including," and "having" (and conjugations thereof) are used interchangeably to mean including but not necessarily limited to, and are open-ended terms not intended to exclude additional, unrecited elements or method steps.

A "confluence region" is a junction at which two or more streams of fluid meet one another. The streams of fluid may include a stream of sample fluid and one or more streams of focusing fluid, each of which may be directed to the junction by a respective channel of a channel network.

"Coupled" means to be in such relation that the performance of one influences the performance of the other, may include being connected, either permanently or releasably, whether directly or indirectly through intervening components, and is not necessarily limited to physical connection(s).

A "detection station" is an optical subsystem location including at least one light source to irradiate an interrogation zone with light, at least one optical sensor to detect optical radiation from the interrogation zone, and, optionally, one or more optical elements to relay or condition the light/optical radiation between the light source(s) and the interrogation zone and/or between the interrogation zone and the optical sensor(s).

A "droplet" is a small volume of liquid encapsulated by an immiscible fluid (e.g., encapsulated by an immiscible liquid, which may form a continuous phase of an emulsion). The immiscible liquid may include oil and/or may be composed predominantly of oil. Droplets disclosed herein may, for example, have an average volume of less than about 500 nL, 100 nL, 10 nL, or 1 nL, among others.

"Exemplary" means "illustrative" or "serving as an example." Similarly, the term "exemplify" (or "exemplified") means "to illustrate by giving an example." Neither term implies desirability or superiority.

"First," "second," "alpha," "beta," and similar terms are used to distinguish or identify various members of a group, or the like, in the order they are introduced in a particular context and are not intended to show serial or numerical limitation.

A "fluid sheath" is one or more layers of fluid located on opposite sides of and/or surrounding a fluid core, such as a fluid core formed by a sample fluid. The fluid sheath and the fluid core both may be flowing in the same direction but may not mix substantially with one another due to laminar flow.

"Fluorescence" is optical radiation emitted in response to absorption of light. As used herein, fluorescence is intended to cover any form of photoluminescence, in which absorption of one or more photons promotes an electron to an excited state and leads to subsequent emission of a new photon, whether from a singlet state, a triplet state, or other state. The excited state produced by absorption may have any suitable lifetime.

A "fluorophore" is any atom, functional group, moiety, or substance capable of fluorescence.

A "focusing fluid" is any fluid that is combined with a stream of sample fluid containing particles, for positioning the particles relative to one another, such as to align, radially position, and/or separate the particles. A focusing fluid interchangeably is described as a sheath fluid.

An "interrogation zone" is a region of a channel or channel network that is irradiated with light, and from which optical radiation is directed.

"Microscopic" means too small to be visible to the unaided eye and/or having a largest dimension that is less than one millimeter.

"Optical radiation" means electromagnetic radiation in the optical spectrum, namely, ultraviolet light, visible light, and/or infrared light. Accordingly, the term "light" has the same meaning as optical radiation.

An "optical sensor" is any type of light-sensing device. Exemplary optical sensors include photodiodes, avalanche photodiodes, photomultipliers, phototransistors, and the like. The optical sensor may be configured to convert detected light into an electrical output (e.g., voltage, current, or resistance) and/or a digital output.

A "particle" is any small (e.g., microscopic), discrete object, such as a piece or volume of matter. A particle may be substantially solid (i.e., a solid-phase particle), liquid (i.e., a liquid-phase particle), or a combination thereof, among others. Exemplary particles include droplets, beads, biological cells, and viral particles. An exemplary dimension (e.g., length or diameter) of particles include less than 2000, 1000, 500, 200, or 100 micrometers, and/or at least 5, 10, or 20 nanometers, among others.

A "port" is an opening at and through which fluid enters or leaves a structure. A port may be located at a junction of a first structure, such as a channel, and a second structure, such as another channel or a confluence region.

A "positive/negative pressure source" is any device capable of applying positive pressure or negative pressure (suction) to fluid. Exemplary positive/negative pressure sources include pumps, vacuum chambers, compressed gas chambers, or the like.

A "pump" is any device that drives movement of fluid, such as flow through a channel(s), by mechanical action or application of an electric field. The pump may be a mechanical pump, such as a positive-displacement pump (e.g., a piston pump, a syringe pump, a diaphragm pump, a gear pump, a peristaltic pump, a lobe pump, etc.), a centrifugal pump, or the like. Alternatively, the pump may be an electrokinetic pump that drives fluid flow using an electric field. Exemplary electrokinetic pumps include electroosmotic pumps.

A "sample fluid" is any fluid containing a sample and/or particles of interest.

A "singulator" is a device and/or structure that combines streams of fluid to arrange particles in single file and/or increase the average axial separation of the particles from one another.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Transverse" means perpendicular or oblique to a longitudinal axis, such as within 45 degrees of precisely perpendicular.

II. Overview

This section provides an overview of the methods and systems described herein.

A method of detecting particles is provided. In the method, a sample fluid including the particles may be driven from a sample inlet channel, through a confluence region, and into a sample outlet channel defining a longitudinal axis. Focusing fluid may be introduced into the confluence region from at least two focusing channels along respective introduction axes. Introducing may be rotationally asymmetrical about the longitudinal axis. The introduction axes and the longitudinal axis may collectively extend in three dimensions. The particles may be passed through an interrogation zone of the sample outlet channel. The interrogation zone may be irradiated with light. Optical radiation may be detected from the interrogation zone.

Another method of detecting particles is provided. In the method, a sample fluid including the particles may be driven from a sample inlet channel, through a confluence region, and into a sample outlet channel defining a longitudinal axis. Focusing fluid may be introduced into the confluence region along two or more introduction axes that collectively have rotational asymmetry about the longitudinal axis. The particles may be passed through an interrogation zone of the sample outlet channel. The interrogation zone may be irradiated with light. Optical radiation may be detected from the interrogation zone.

A system for detecting particles is provided. The system may comprise a channel network including a confluence region fluidically connecting a sample inlet channel and a sample outlet channel to one another. The sample outlet channel may define a longitudinal axis. The channel network also may include at least two focusing fluid channels defining respective introduction axes and fluidically connected to the confluence region at two or more ports. The introduction axes and the longitudinal axis collectively may extend in three dimensions. The system also may comprise one or more positive/negative pressure sources operatively connected to the channel network and configured to drive a sample fluid including the particles from the sample inlet channel, through the confluence region, and through an interrogation zone of the sample outlet channel, and to drive introduction of focusing fluid into the confluence region asymmetrically about the longitudinal axis. The system further may comprise a detection station including a light source configured to irradiate the interrogation zone with light, and also may include an optical sensor configured to detect optical radiation from the interrogation zone.

III. Examples, Components, and Alternatives

The following subsections, A to D, describe selected aspects of exemplary methods and system for detecting particles positioned off-axis by rotationally asymmetrical introduction of focusing fluid. The examples in these subsections are intended for illustration and should not be interpreted as limiting the entire scope of the present disclosure. Each subsection may include one or more distinct examples, and/or contextual or related information, function, structure, and/or processes.

A. Detection Systems for Particles

This subsection provides an overview of illustrative detection systems for particles, where each detection system positions particles off-axis upstream of a detection station; see FIGS. 1-13.

FIG. 1 shows an illustrative detection system 100 for particles 102. The detection system has a fluidics subsystem 104 extending through a detection station 106. Fluidics subsystem 104 is configured to separate particles 102 from one another along a flow path upstream of detection station 106, position the particles laterally (off-axis) with respect to the flow path, and pass the separated, positioned particles serially through the detection station.

Fluidics subsystem 104 includes a sample reservoir 107, a focusing reservoir 108, and a waste receptacle 109, which are fluidically connected to one another by a channel network 110. Sample reservoir 107 contains, and supplies to channel network 110, a sample fluid 112 including particles 102 enclosed by a carrier fluid 114. Focusing reservoir 108 contains, and supplies to channel network 110, focusing fluid 116. Waste receptacle 109 receives sample fluid 112 combined with focusing fluid 116 from channel network 110 downstream of detection station 106.

Channel network 110 has a set of channels that carry sample fluid 112 and focusing fluid 116 to (and from) a singulator 117, which provides a confluence region 118. A sample inlet channel 120 conveys sample fluid 112 to confluence region 118 of the singulator. At least one focusing fluid channel 122 conveys focusing fluid 116 to confluence region 118 of the singulator. In some examples, two or more focusing fluid channels may convey focusing fluid 116 to confluence region 118, as indicated by an ellipsis 123 between focusing fluid channel 122 and another (dashed) focusing fluid channel 122a. A sample outlet channel 124 conveys a combination of sample fluid 112 and focusing fluid 116 from confluence region 118 through detection station 106.

Focusing fluid 116 enters confluence region 118 from each focusing fluid channel 122, 122a at a respective focusing fluid port 126, 126a. The number of focusing fluid ports utilized by the detection system to introduce focusing fluid into the confluence region provides a shorthand in the present disclosure to distinguish different system examples (e.g., a "one-port", "two-port", "three-port", or "four-port" detection system). The focusing fluid channel(s) and port(s)

of the detection system are configured (e.g., sized, oriented, and/or positioned) to introduce focusing fluid 116 rotationally asymmetrically into confluence region 118, which positions particles 102 off-axis in sample outlet channel 124.

Fluidics subsystem 104 includes a pair of positive/negative pressure sources, namely, a sample pump 128a and a focusing pump 128b, to drive flow of sample fluid 112 and focusing fluid 116, respectively, from sample reservoir 107 and focusing reservoir 108 into and through channel network 110. In other examples, alternatively or in addition, the fluidics subsystem includes a pump downstream of singulator 117 and/or detection station 106.

Detection station 106 includes a light source(s) 130, an optical sensor(s) 132, and one or more optical elements 133. Light source 130 is configured to irradiate an interrogation zone 134 of sample outlet channel 124 with light. Optical sensor 132 is configured to detect optical radiation from interrogation zone 134. Optical elements 133 provide irradiation optics to relay light from light source 130 to interrogation zone 134 and/or to condition the light. Optical elements 133 also provide detection optics to collect the optical radiation from interrogation zone 134, condition the collected optical radiation, and/or relay the optical radiation to optical sensor 132. In some examples, irradiation may be performed by light source 130 directly, without separate irradiation optics, and/or detection may be performed by optical sensor 132 without separate detection optics.

Figures 2, 3, 4:
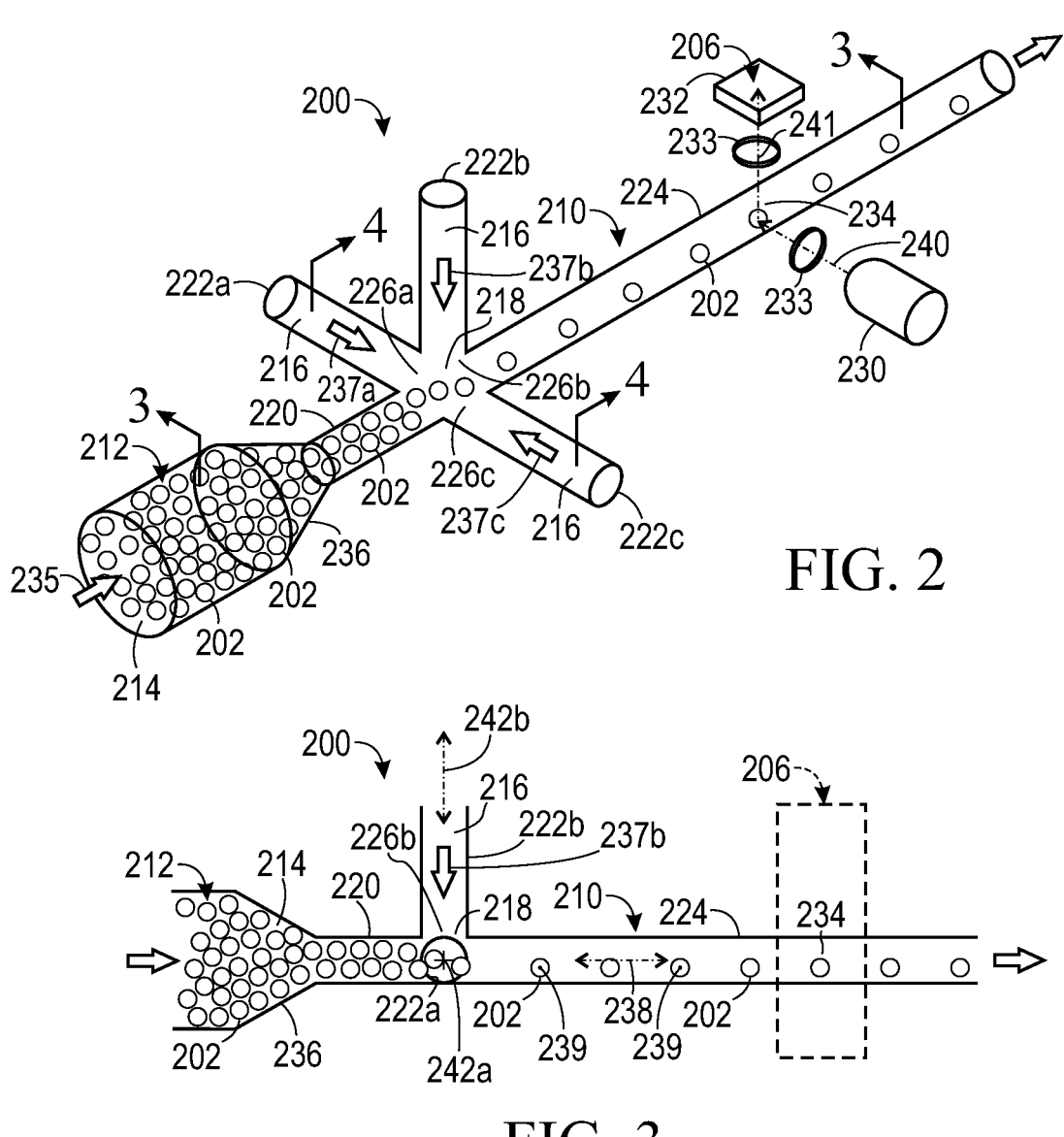
FIG. 2 is a somewhat schematic, fragmentary isometric view of selected aspects of an illustrative "three-port" detection system in which focusing fluid is introduced asymmetrically into a confluence region via three ports.
FIG. 3 is a somewhat schematic, fragmentary sectional view of the illustrative detection system of FIG. 2, taken generally along line 3-3 of FIG. 2.
FIG. 4 is another somewhat schematic, fragmentary sectional view of the illustrative detection system of FIG. 2, taken generally along line 4-4 of FIG. 2.

FIGS. 2-4 shows an illustrative "three-port" detection system 200 in which focusing fluid 216 is introduced rotationally asymmetrically into a confluence region 218 at three ports 226a-226c. Detection system 200 may have any combination of the system components and features described above in relation to detection system 100 (also see FIG. 1). For example, the detection system has a channel network 210 including a sample inlet channel 220, three focusing fluid channels 222a-222c ending at respective ports 226a-226c, and a sample outlet channel 224. A confluence region 218 is formed where sample inlet channel 220 and focusing fluid channels 222a-222c join one another, at or adjacent the upstream end of sample outlet channel 224. The sample outlet channel extends downstream through a detection station 206, in which an interrogation zone 234 of the channel is irradiated.

A sample fluid 212 including particles 202 and carrier fluid 214 flows along sample inlet channel 220 toward confluence region 218, indicated by a flow arrow 235. Sample inlet channel 220 includes a tapered section 236 that narrows toward confluence region 218. Tapered section 236 reduces the diameter of sample inlet channel 220, such that particles 202 are positioned closer, on average, to the longitudinal axis of the sample inlet channel and in increased axial alignment with one another, for at least approximately single-file entry into confluence region 218.

Focusing fluid 216 flows to confluence region 218 in respective focusing fluid channels 222a-222c, indicated by flow arrows 237a-237c. More specifically, three streams of focusing fluid 216 enter confluence region 218 via three ports 226a-226c, where these streams are combined with a stream of sample fluid. Ports 226a-226c are arranged rotationally asymmetrically about a longitudinal axis 238 defined by sample outlet channel 224 (and/or defined collectively by sample inlet channel 220 and sample outlet channel 224). Longitudinal axis 238 is centered across one or both channels and may be linear or at least partially non-linear (e.g., curved at one or more positions along the axis). The asymmetrical arrangement of focusing fluid channels 222a-222c and ports 226a-226c causes particles 202 to be focused off-axis, with a lateral offset (e.g., a radial offset) from longitudinal axis 238 (see FIG. 3). More specifically, in the present example, an average position of centers 239 of particles 202 is offset vertically below longitudinal axis 238, but other directions of offset may be suitable.

Focusing fluid channels 222a-222c define respective introduction axes 242a-242c along which focusing fluid 216 is introduced into confluence region 218 (see FIGS. 3 and 4). In the example depicted, the three introduction axes 242a-242c considered collectively lack rotational symmetry because rotationally-adjacent pairs of the introduction axes are rotationally offset from one another about longitudinal axis 238 by different angles. More specifically, introduction axes 242a and 242b are offset by 90 degrees, introduction axes 242b and 242c are offset by 90 degrees, but introduction axes 242a and 242c are offset by 180 degrees. In other examples using two or more focusing channels, a rotationally-adjacent pair of introduction axes defined by the two or more focusing channels may be rotationally offset from one another (without any intervening introduction axes) by at least 120, 150, 180, or 210 degrees, among others, and/or a rotationally-adjacent pair of the introduction axes may be rotationally offset from one another by less than 120, 110, 100, 90, or 80 degrees. In the example depicted, introduction axes 242a-242c are coplanar with one another (each lying in the same plane orthogonal to longitudinal axis 238), and are each arranged radially with respect to the longitudinal axis. In other examples using one or more focusing channels, at least one (and/or each) of the introduction axes may not be orthogonal to longitudinal axis 238, such as forming an angle of at least 10, 20, or 30 degrees with a plane that is orthogonal to the longitudinal axis. Alternatively, or in addition, at least one (and/or each) of the introduction axes may not be radial with respect to the longitudinal axis of the sample outlet channel (i.e., the at least one and/or each introduction axis does not intersect the longitudinal axis. Arranging introduction axes to be non-orthogonal and/or non-radial to the longitudinal axis allows off-axis focusing of particles to be more precise for more consistent detection results.

Detection station 206 illustrates a possible arrangement for components thereof (see FIG. 2). A light source 230 irradiates interrogation zone 234 on an irradiation axis 240 via an optical element(s) 233 that focuses the light onto the interrogation zone. The light may induce fluorescence from particles 202, which is detected on a detection axis 241 by an optical sensor 232 that receives optical radiation from interrogation zone 234 via an optical element(s) 233 that collects the optical radiation and directs it to the optical sensor. In the present example, irradiation axis 240 and detection axis 241 are orthogonal to one another, but other arrangements, such as epifluorescence detection using the same objective for focusing irradiation light and collecting fluorescence, may be suitable. In other examples, the optical radiation detected may, for example, be irradiation light that has been scattered.

Figures 5, 6, 7:
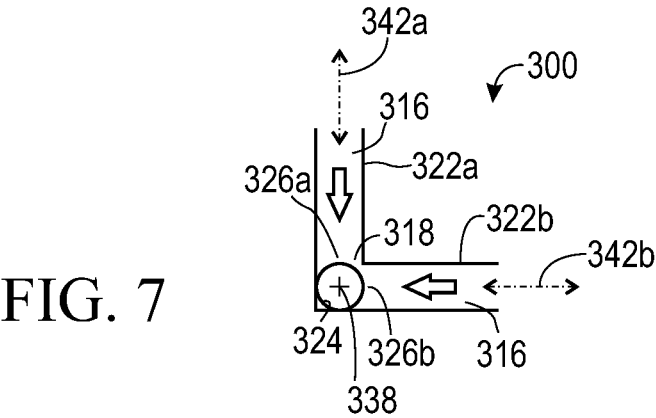
FIG. 5 is a somewhat schematic, fragmentary isometric view of selected aspects of an illustrative "two-port" detection system in which focusing fluid is introduced asymmetrically into a confluence region via two ports.
FIG. 6 is a somewhat schematic, fragmentary sectional view of the illustrative detection system of FIG. 5, taken generally along line 6-6 of FIG. 5.
FIG. 7 is another somewhat schematic, fragmentary sectional view of the illustrative detection system of FIG. 5, taken generally along line 7-7 of FIG. 5.

FIGS. 5-7 shows an illustrative "two-port" detection system 300 in which focusing fluid 316 is introduced rotationally asymmetrically into a confluence region 318 at two ports 326a, 326b. Detection system 300 may have any combination of the system components and features described above in relation to detection systems 100 and 200 (also see FIGS. 1-4). For example, the detection system has a channel network 310 including a sample inlet channel 320, two focusing fluid channels 322a, 322b ending at respective ports 326a, 326b, and a sample outlet channel 324. Confluence region 318 is formed where sample inlet channel 320 and focusing fluid channels 322a, 322b join one another, at or adjacent the upstream end of sample outlet channel 324. The sample outlet channel extends downstream through a detection station 306, in which an interrogation zone 334 of sample outlet channel 324 is irradiated.

A sample fluid 312 including particles 302 and carrier fluid 314 flows along sample inlet channel 320 toward confluence region 318, indicated by a flow arrow 335. Sample inlet channel 320 includes a tapered section 336 as described above for detection system 200 (also see FIGS. 2 and 3).

Focusing fluid 316 flows to confluence region 318 in respective focusing fluid channels 322a, 322b, indicated by flow arrows 337a, 337b. More specifically, two streams of focusing fluid 316 enter confluence region 318 via two ports 326a, 326b, where these streams are combined with a stream of sample fluid. Ports 326a, 326b are arranged rotationally asymmetrically about a longitudinal axis 338 defined by sample outlet channel 324 (and/or defined collectively by sample inlet channel 320 and sample outlet channel 324). The asymmetrical arrangement of focusing fluid channels 322a, 322b and ports 326a, 326b causes particles 302 to be positioned off-axis, with a lateral offset (e.g., a radial offset) from longitudinal axis 338 (see FIG. 6), generally as described above for detection system 200 (also see FIGS. 2 and 3).

Focusing fluid channels 322a, 322b define respective introduction axes 342a, 342b along which focusing fluid 316 is introduced into confluence region 318 (see FIGS. 6 and 7). In the present example, introduction axes 342a, 342b are rotationally offset from one another by 90 degrees, coplanar with one another, and orthogonal to longitudinal axis 338. However, other arrangements for the introduction axes may be suitable, as described above.

FIG. 8 shows an illustrative "four-port" detection system 400 in which focusing fluid 416 is introduced symmetrically (instead of asymmetrically). Focusing fluid 416 is conveyed into a confluence region by four focusing fluid channels 422a-422d through four ports thereof, along respective introduction axes 442a-442d. Due to the rotational symmetry of focusing fluid channels 422a-422d, and their equal diameters, the orthogonal forces applied on the stream of sample fluid 412 entering the confluence region cancel one another out, such that the net lateral displacement force on the sample fluid is zero.

The view of FIG. 8 is taken downstream of the confluence region through an interrogation zone 434 of a sample outlet channel 424, orthogonal to a longitudinal axis 438 defined by the sample outlet channel. Particles 402 are focused to a particle localization zone 443 (in dashed outline) centered on longitudinal axis 438, due to the lack of a net displacement force. The particle localization zone represents an area or volume within which substantially all (e.g., greater than 95% or 99%) of the particles pass through interrogation zone 434, at given flow rates of sample fluid 412 and focusing fluid 416, a given particle size, and the like. The particle localization zone may be defined with respect to particle centers 439, as in the present example, or with respect to the peripheries of the particles, among others. As explained in more detail below in Subsection C, "small" particles having an average diameter that is significantly smaller than the channel diameter at interrogation zone 434, such as less than 70%, 60%, 50%, or 40% of the channel diameter, among others, may not be aligned with one another efficiently by symmetrical focusing.

FIG. 9 shows a graph of a signal that may be detected from interrogation zone 434 as identical small particles 402 pass through serially. Due to the large diameter of particle localization zone 443 relative to the size of the small particles, the small particles are not irradiated consistently with light and/or the efficiency of signal detection is variable. For example, excitation light (e.g., from an LED) may propagate to the small particles through one or more optical lenses having a focal distance. The light emitted from the small particles in response to the excitation light may propagate through another set of one or more optical lenses (having another focal distance) to reach the optical sensor. When the positions of the small particles are offset differing distances from the focal points, the intensity of excitation light incident on the small droplets varies, and the intensity of emitted light reaching the optical sensor varies. As a result, the signal amplitude of four signal peaks 444, produced by four identical particles 402, varies significantly, which reduces the accuracy and precision of particle detection.

FIG. 10 shows asymmetrical three-port detection system 200 for comparison with symmetrical four-port detection system 400 of FIG. 8 (also see FIGS. 2-4). Focusing fluid 216 is introduced asymmetrically via three focusing channels 222a-222c along respective introduction axes 242a-242c. Due to the lack of rotational symmetry of focusing fluid channels 222a-222c, and their equal diameters, the orthogonal forces applied on the stream of sample fluid 212 entering the confluence region do not completely cancel one another out, such that there is a net lateral force 245 on the sample fluid and/or particles 202 therein. The net lateral force is a radial force in this example.

The view of FIG. 10 is taken the same way as that of FIG. 8, namely, downstream of confluence region 218 through interrogation zone 234 of sample outlet channel 224, in a plane orthogonal to longitudinal axis 238 (also see FIGS. 2-4). Particles 202 are focused to a particle localization zone 243 (in dashed outline) having a lateral offset 246 from longitudinal axis 238, due to the presence of net lateral force 245. Particle localization zone 243 is defined as described above for FIG. 8 using the same size of particles, and the same flow rates of sample fluid and focusing fluid. Particle centers 239 of particles 202 are focused to a significantly smaller area than for particles 402 in FIG. 8, due to net lateral force 245.

FIG. 11 shows a graph of a signal that may be detected from interrogation zone 234 as identical small particles 202 pass through serially. Due to the reduced area of particle localization zone 243 (compare with particle localization zone 443 of FIG. 8), the small particles are irradiated more consistently with light and/or the efficiency of signal detection is more uniform. As a result, the signal amplitudes of four signal peaks 244, produced by four identical particles 202, have less variation, which improves the accuracy and precision of particle detection relative that of symmetrical detection system 400.

Figures 12, 13:
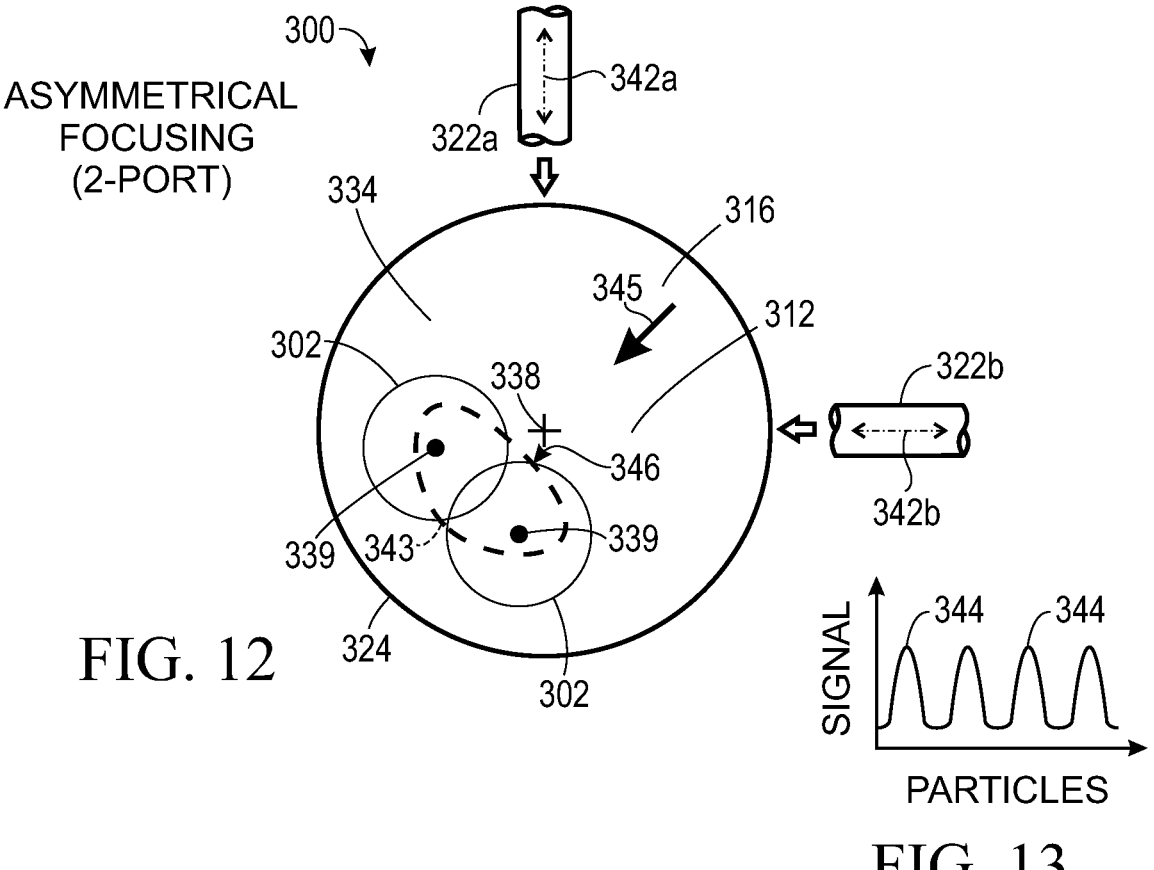
FIG. 12 is a fragmentary schematic view of the detection system of FIG. 5, taken as in FIG. 8 through an interrogation zone of a sample outlet channel, and indicating an off-axis particle localization zone (in dashed outline) that is radially offset from the longitudinal axis of the sample outlet channel and significantly narrower than the wide particle localization zone shown in FIG. 8, due to the rotationally asymmetrical introduction of focusing fluid at two ports.
FIG. 13 is a graph of a signal that may be detected from identical particles passing through the interrogation zone of FIG. 12 and illustrating a more consistent signal amplitude measured from the identical particles (relative to FIG. 9) due to the narrower particle localization zone.

FIG. 12 shows asymmetrical two-port detection system 300 for comparison with symmetrical four-port detection system 400 of FIG. 8 and asymmetrical three-port detection system 100 of FIG. 10 (also see FIGS. 2-7). Focusing fluid 316 is introduced rotationally asymmetrically via two focusing channels 322a, 322b along respective introduction axes 342a, 342b. Due to the lack of rotational symmetry of focusing fluid channels 322a, 322b, and their equal diameters, the orthogonal forces applied on the stream of sample fluid 312 entering the confluence region do not cancel one another out, such that there is a net lateral force 345 on the sample fluid and/or particles 302 therein. Net lateral force 345 is a radial force in this example.

The view of FIG. 12 is taken the same way as that of FIG. 8, namely, downstream of confluence region 318 through interrogation zone 334 of sample outlet channel 324, in a plane orthogonal to longitudinal axis 338. Particles 302 are focused to a particle localization zone 343 (in dashed outline) having a radial offset 346 from longitudinal axis 338, due to the presence of net lateral force 345. Particle localization zone 343 is defined as described above for FIG. 8 using the same size of particles, and the same flow rates of sample fluid and focusing fluid. Particle centers 339 of particles 302 are focused to a significantly smaller area than particles 402 in FIG. 8, due to net lateral force 345.

FIG. 13 shows a graph of a signal that may be detected from interrogation zone 334 as identical small particles 302 pass through serially. Due to the reduced area of particle localization zone 343 (compare with particle localization zone 443 of FIG. 8), the small particles are irradiated more consistently with light and/or the efficiency of signal detection is more uniform. As a result, the signal amplitudes of four signal peaks 344, produced by four identical particles 302, has less variation, which improves the accuracy and precision of particle detection relative that of symmetrical detection system 400.

The direction and size of the radial offset from the longitudinal axis may be controlled by the number, orientation, diameters, and/or relative flow rates of the focusing fluid channels. In some examples, a radial offset at least generally orthogonal (within 20, 10, or 5 degrees of precisely orthogonal) to the irradiation axis of a detection station may provide the best consistency for particle irradiation. In some examples, a radial offset at least generally orthogonal (within 20, 10, or 5 degrees of precisely orthogonal) to the detection axis of a detection station may provide the best consistency for detecting optical radiation from the particles.

B. Detection Methods for Particles

Figure 14:
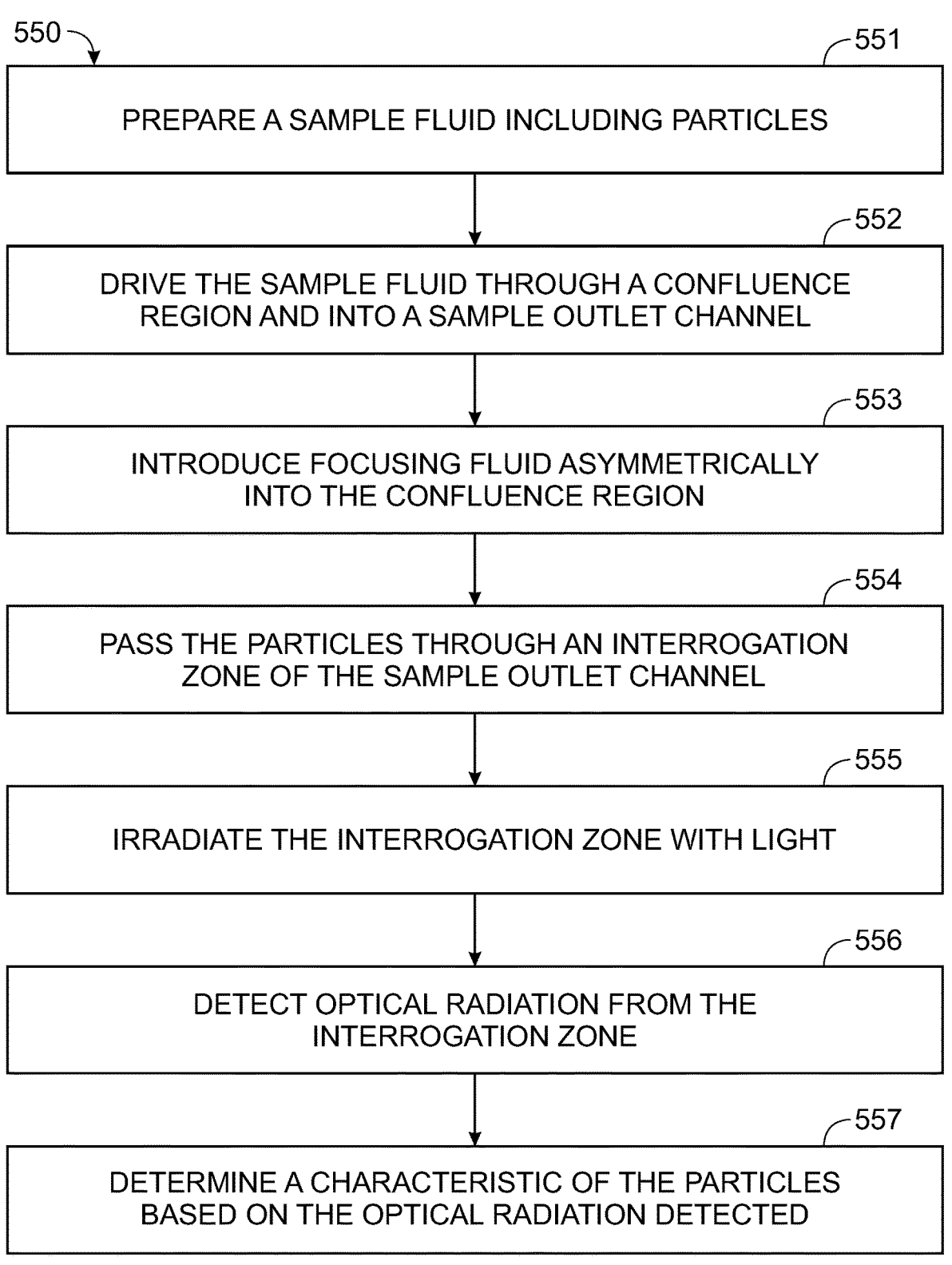
FIG. 14 is a flowchart listing exemplary steps that may be performed in a method of detecting particles.

This subsection describes illustrative methods of detecting particles, where the particles are positioned off-axis by rotationally asymmetrical introduction of focusing fluid; see FIG. 14. Each method may include any suitable combination of the steps listed in flowchart 550 of FIG. 14, performed in any suitable order, and with any of the steps omitted or performed any suitable number of times, and using or including any of the features, aspects, configurations, additional steps, or modifications described elsewhere in the present disclosure.

In a preparing step 551, a sample fluid is prepared. The sample fluid includes particles and a carrier fluid in which the particles are enclosed. In some examples, the carrier fluid may include oil. In some examples, the carrier fluid may be aqueous. The particles may be droplets, beads, fragments, biological cells, viral particles, particulates, granules, or the like.

In a driving step 552, the sample fluid is driven through a confluence region and into a sample outlet channel. Driving may be performed using one or more pumps and/or sources of positive/negative pressure. The sample fluid may be driven into the confluence region from a sample inlet channel. The sample inlet channel may have a tapered region that tapers toward the confluence region. The sample inlet channel and the sample outlet channel may be coaxial with one another.

In an introducing step 553, focusing fluid is introduced rotationally asymmetrically into the confluence region. The focusing fluid may be introduced in a single focusing stream along a single introduction axis, or may be introduced in two or more focusing streams along two or more respective introduction axes. The two or more focusing streams may have the same diameters and volumetric flow rates, or may have different diameters and/or different volumetric flow rates. The focusing fluid may be introduced with rotational asymmetry about a longitudinal axis defined by the sample outlet channel. The rotational asymmetry may be a rotational asymmetry of the single introduction axis or the two or more introduction axes along which the focusing fluid is introduced. Alternatively, or in addition, the rotational asymmetry may be a rotational asymmetry of the single focusing stream or the two or more focusing streams in which the focusing fluid is introduced.

Each introduction axis may have any suitable orientation. Each introduction axis may be orthogonal or non-orthogonal to the longitudinal axis defined by the sample outlet channel. In some examples, the introduction axes are coplanar with one another to define a plane that is orthogonal to the longitudinal axis.

Introducing may be performed at any suitable number of ports, such as a single port, two or more ports, or three or more ports, among others. Each of the ports may be formed at a junction of a respective focusing fluid channel and the confluence region.

Introducing the focusing fluid may be performed at any suitable flow rate relative to the flow rate of driving the sample fluid into the confluence region. In some examples, the flow rate of introducing is at least 5, 10, 15, or 20 times the flow rate of driving.

Introducing may result in an average position of the particle centers in the interrogation zone that is radially offset from the longitudinal axis of the sample outlet channel. Introducing may apply a net force on the particles and/or sample fluid in a direction transverse to the longitudinal axis.

In a passing step 554, the particles are passed through an interrogation zone of the sample outlet channel. The particles may pass serially through interrogation zone and/or with an average radial offset from the longitudinal axis, as described above.

In an irradiating step 555, the interrogation zone is irradiated with light. The light may include excitation light for a fluorophore(s) associated with the particles (e.g., located on or in the particles).

In a detecting step 556, optical radiation is detected from the interrogation zone. The optical radiation may include fluorescence and/or scattered light.

In a determining step 557, a characteristic of the particles is determined based on the optical radiation detected. The characteristic may include a presence/absence or an amount of an analyte (e.g., a nucleic acid target), a particle size, or the like.

C. Comparison of Symmetrical and Asymmetrical Detection System Configurations

This subsection describes testing data obtained with a symmetrical four-port detection system for droplets (as particles), and various asymmetrical three-port, two-port, and one-port detection systems; see FIGS. 15-38.

Figure 15:
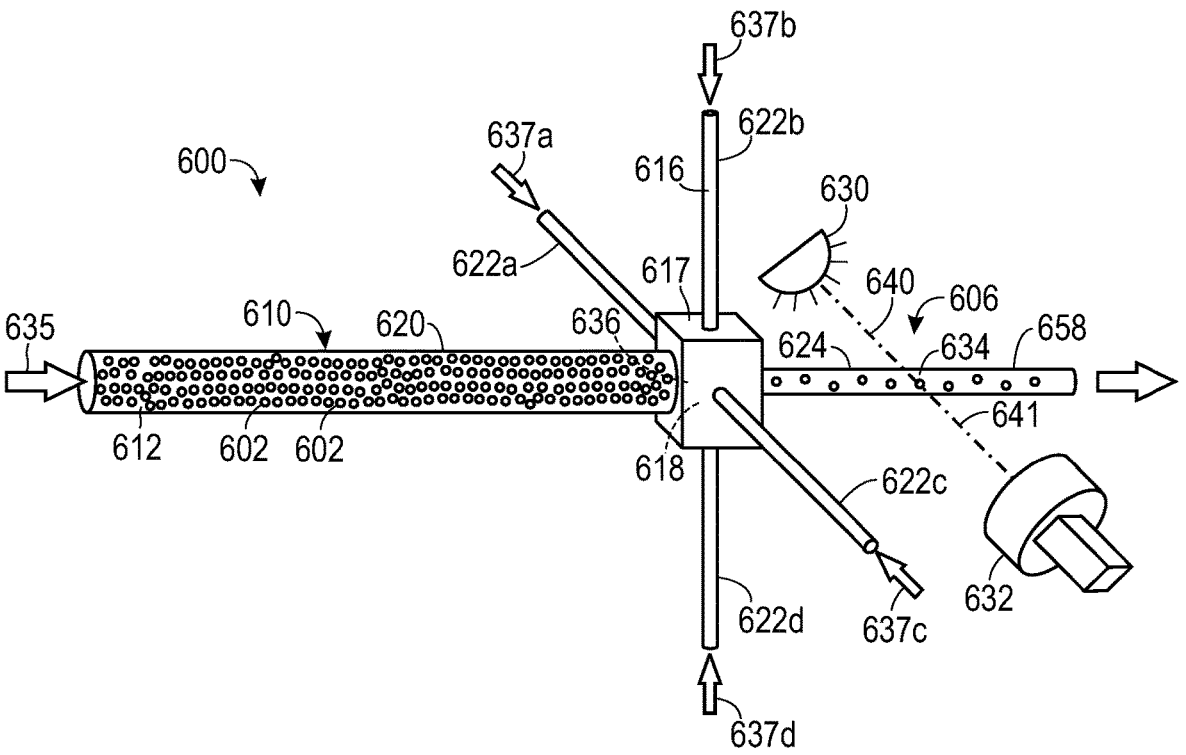
FIG. 15 is a somewhat schematic, fragmentary axonometric view of selected aspects of a working model of a "four-port" detection system for droplets (as particles) in which focusing fluid is introduced rotationally symmetrically (instead of asymmetrically) into a confluence region at four ports.

FIG. 15 shows aspects of a working model of a "four-port" detection system 600 for aqueous droplets 602. The droplets are present in a sample fluid 612 including an immiscible carrier fluid, which is an oil that encapsulates each of the aqueous droplets and provides a continuous phase. Focusing fluid 616 has the same composition as the carrier fluid and is injected symmetrically (instead of rotationally asymmetrically) into a confluence region 618 from four focusing fluid channels 622a-622d at four ports.

Detection system 600 has a channel network 610 including a sample inlet channel 620, focusing fluid channels 622a-622d, a singulator 617, and a sample outlet channel 624 (defined by a capillary tube 658). Sample inlet channel 620 conveys sample fluid 612, including aqueous droplets 602, to confluence region 618, as indicated by a flow arrow 635, and as described above for other detection systems 100, 200, and 300 (see Subsection A and FIGS. 1-7). Sample inlet channel 620 has a tapered region 636 at a downstream end thereof, which is formed by singulator 617. Focusing fluid 616 is conveyed to confluence region 618 by focusing fluid channels 622a-622d, indicated by respective flow arrows 637a-637d. The focusing fluid is introduced into the confluence region orthogonally to a longitudinal axis of sample outlet channel 624, as focusing fluid streams traveling along respective introduction axes that are orthogonal to the longitudinal axes. Moreover, the focusing fluid streams are arranged rotationally symmetrically, with the same flow rate of the focusing fluid, to balance one another, such that sample fluid 612 is focused on the longitudinal axis of sample outlet channel 624 (i.e., centered in the sample outlet channel). Streams of focusing fluid from focusing fluid channels 622a and 622c are coaxial to one another and flowing in opposite directions, as are streams of focusing fluid from focusing fluid channels 622b and 622d. Focusing fluid 616 has a volumetric flow rate that is 25 times the volumetric flow rate of sample fluid 612, in order to tightly focus the stream of sample fluid to about 4% of the cross-sectional area of sample outlet channel 624.

Sample fluid 612 and focusing fluid 616 travel through a detection station 606 downstream of confluence region 618. Detection station 606 includes a light source 630 to irradiate an interrogation zone 634 of the detection station along an irradiation axis 640 of sample outlet channel 624. A high-speed camera 632 captures images of irradiation zone 640 viewed along a horizontal detection axis 641 as droplets 602 pass through serially.

Singulator 617 provides 4-way oil injection, to create sheathing flow that is designed to keep droplets in the center of the capillary tube. Based on the droplet velocity inside capillary tube 658, the Reynolds number is calculated as 430. This means that the flow regime inside capillary tube 658 is laminar flow that includes inertia. Therefore, the droplets may be affected by (1) lubrication forces, directed radially inward toward the longitudinal axis of the capillary tube, at positions close to the perimeter due to sheathing flow, (2) a buoyancy force, directed upward, due to a density difference between the oil phase (carrier fluid and focusing fluid) and the droplets, (3) Saffman forces, in random directions, due to the inertial flow regime, and (4) instability resulting from fluid flow pulsation created by syringe pumps that drive flow of the sample fluid and focusing fluid.

Figure 16:
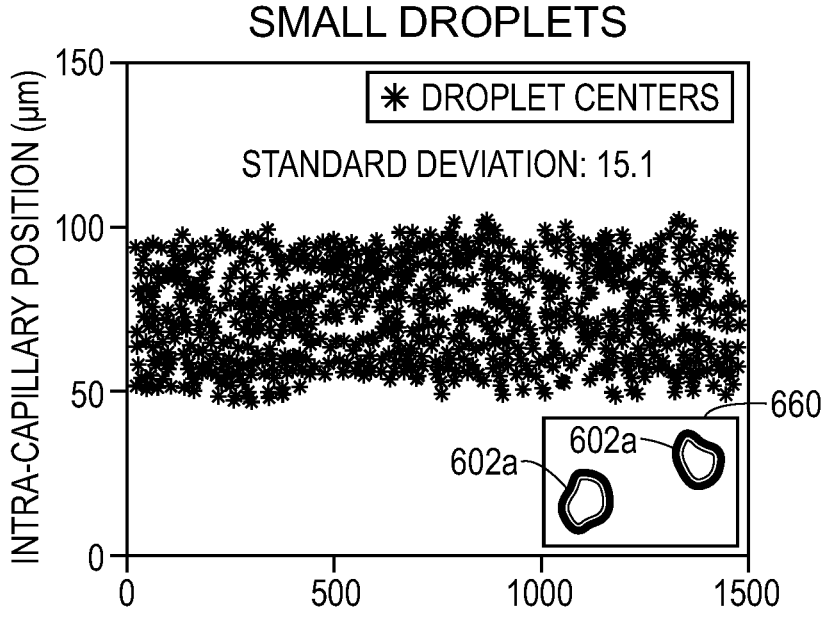
FIGS. 16 and 17 are graphs of positional data collected from small droplets (FIG. 16) and standard droplets (FIG. 17) traversing an interrogation zone of the detection system of FIG. 15.
Figure 17:
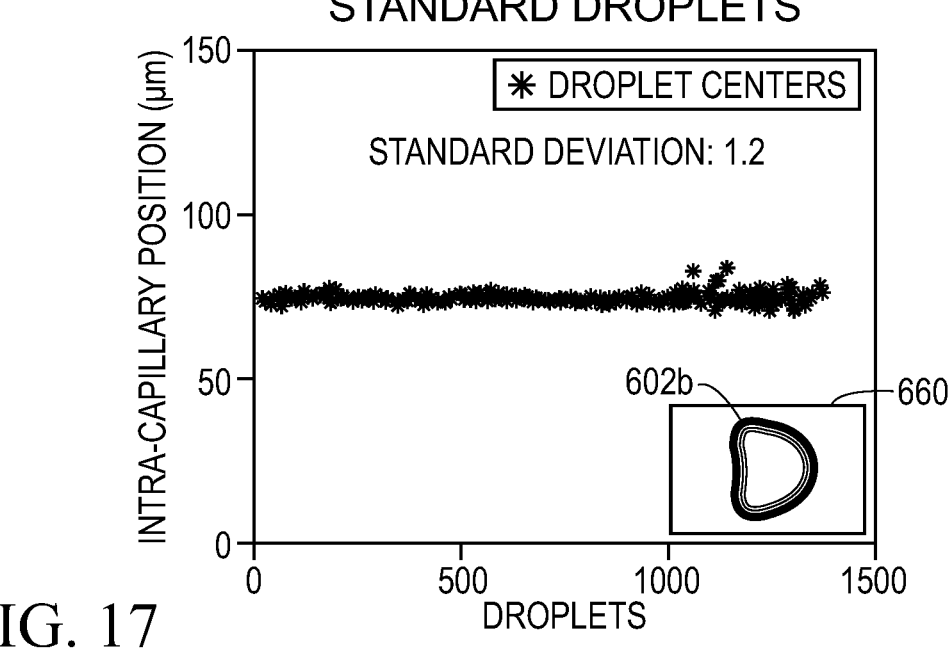

FIGS. 16 and 17 show graphs of positional data collected from "small" droplets 602a (FIG. 16) and "standard" droplets 602b (FIG. 17) traversing interrogation zone 634 of four-port (symmetrical) detection system 600 of FIG. 15. Small droplets 602a have a radius of 31 micrometers, and standard droplets 602b have a radius of 56 micrometers. An exemplary captured image 660 showing one or two droplets 602a or 602b is presented in the low right corner of each graph.

The measured vertical intra-capillary positions of a set of about 1300-1500 droplets 602a and 602b are plotted in each graph. The vertical location of the center of each droplet was determined from an image of the droplet captured by camera 632 and is indicated in the graph by a star. Capillary tube 658 forming sample outlet channel 624 has an inside diameter of 150 micrometers. Accordingly, a droplet that is centered in the capillary tube within the interrogation zone is plotted at 75 micrometers in the graph.

In each of the graphs, the mean vertical position of the droplets is near or at 75 micrometers. However, the standard deviation of the mean varies considerably according to the size and type of droplet. The centers of small droplets 602a are distributed most widely, from about 50 micrometers to 100 micrometers, with a standard deviation of 15.1. High speed video of small droplets 602a traveling along capillary tube 658 reveals substantial vertical motion of the small droplets. Many of the small droplets appear to bounce up and down between invisible barriers within capillary tube 658, as explained further below. In contrast, the centers of standard droplets 602b are tightly clustered along a horizontal line at 75 micrometers, with a standard deviation of 1.2.

Figure 18:
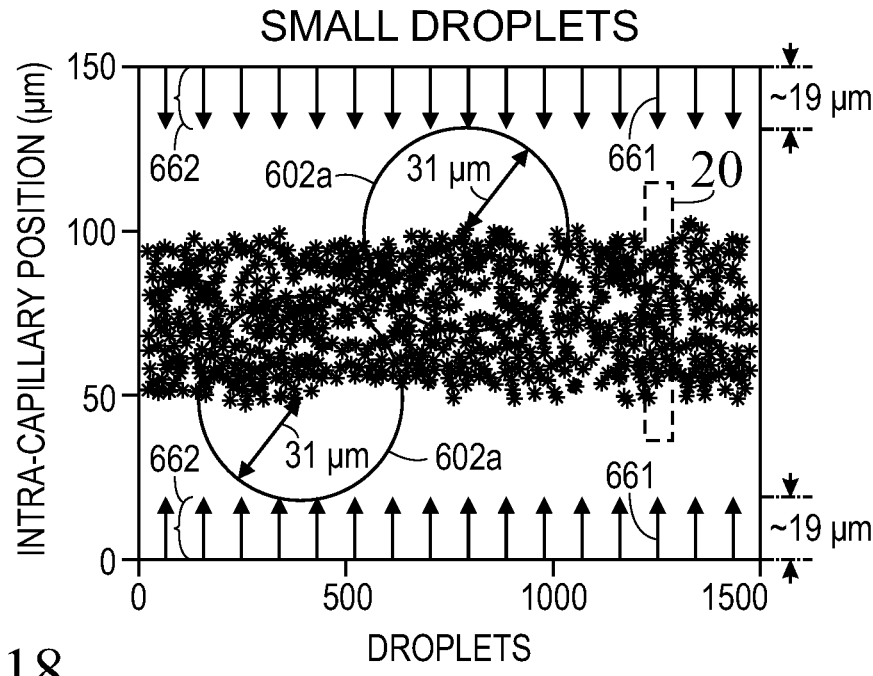
FIG. 18 is the graph of FIG. 16 supplemented to show lubrication forces and how they may affect the distribution of the small droplets.
Figure 19:
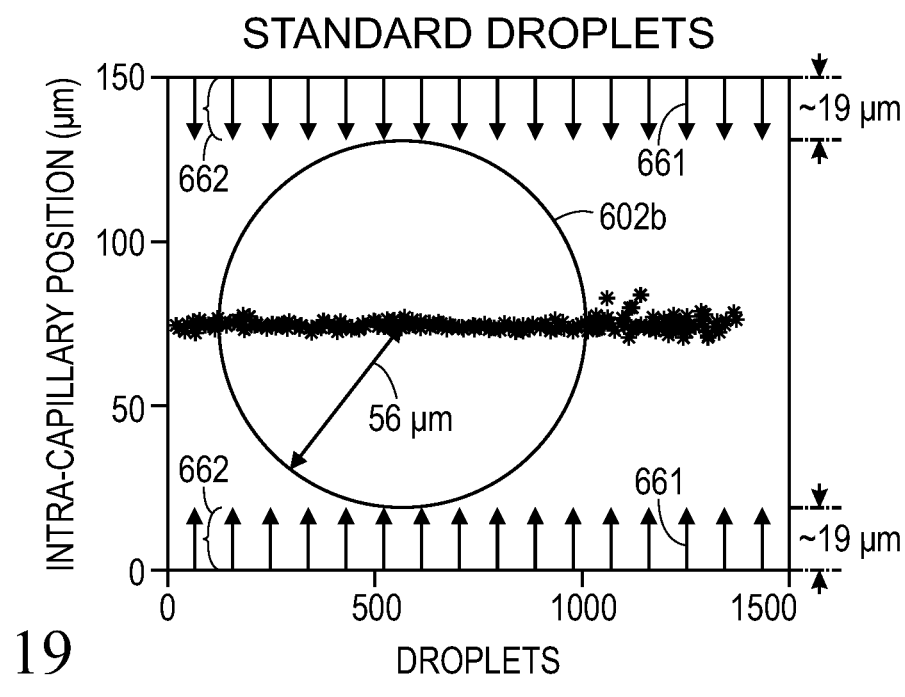
FIG. 19 is the graph of FIG. 17 supplemented to show lubrication forces and how they may affect the distribution of the standard droplets.

FIGS. 18 and 19 use the graphs of FIGS. 16 and 17, respectively, to illustrate how lubrication forces 661 near the wall of capillary tube 658 may affect intra-capillary positioning of small droplets 602a and standard droplets 602b. The lubrication forces create a boundary layer 662 having a thickness of approximately 19 micrometers. Neither small droplets 602a nor standard droplets 602b enter boundary layer 662. The difference in size of small droplets 602a (radius of 31 micrometers) and standard droplets 602b (radius of 56 micrometers), as shown in FIGS. 18 and 19, explains the effect of the boundary layer on the degree of droplet alignment. The centers of small droplets 602a are permitted to travel 50 micrometers off-axis (see FIG. 18). This travel distance is determined by the difference between (a) the inside diameter of capillary tube 658 (i.e., 150 micrometers) and (b) the sum of the diameter of small droplets 602a (i.e., 62 micrometers) and twice the thickness of boundary layer 662 (i.e., 38 micrometers). Accordingly, small droplets 602a can be affected by the different forces described above, such that the small droplets do not travel in a straight line, but instead travel laterally and bounce inside the capillary tube. In contrast, the centers of standard droplets 602b are restricted from moving off-axis, because the inside diameter of capillary tube 658 is approximately the same as the sum of the diameter of standard droplets 602b and twice the thickness of boundary layer 662. In other words, the standard droplets do not have room to migrate laterally and/or to bounce inside the capillary tube, since they are squeezed by the wall lubrication force boundary layer, and thus move on a straight line through the center of the capillary tube.

Figure 20:
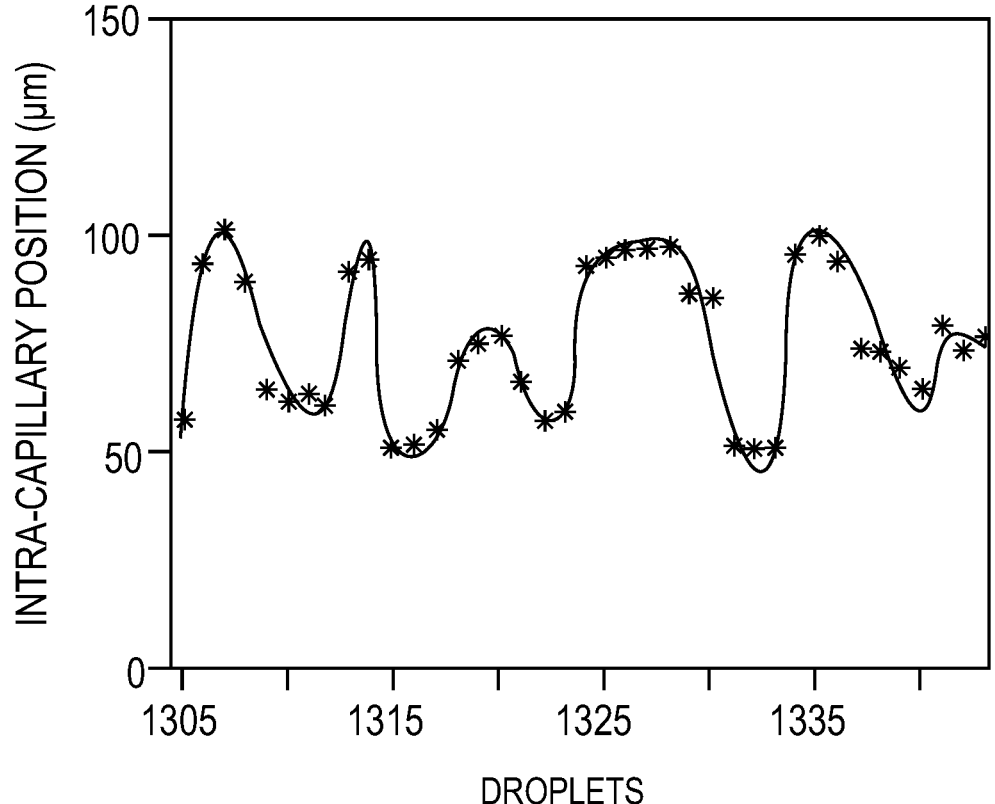
FIG. 20 is a graph of only a portion of the positional data of FIG. 16, where the portion is indicated generally at "20" in FIG. 19.

FIG. 20 shows a graph of the measured intra-capillary positions of a sequence of about forty of the droplets of FIG. 18, which are marked by a box "20" in FIG. 18. The droplet positions have a somewhat periodic pattern for unknown reasons.

Figure 21:
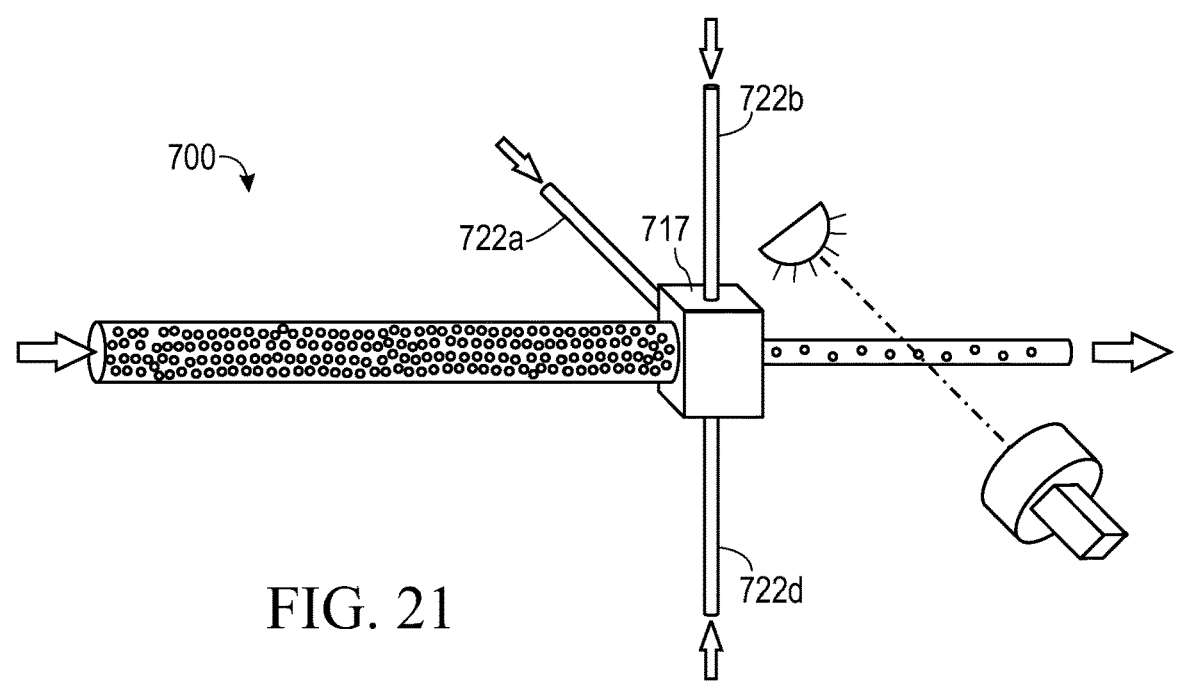
FIG. 21 is a view of a working model of a "three-port" detection system for droplets (as particles), generally as in FIG. 15, except that focusing fluid is introduced rotationally asymmetrically into a confluence region at three ports instead of four ports.

FIG. 21 shows a working model of a "three-port" detection system 700 for droplets. Detection system 700 is identical to detection system 600 of FIG. 15, except that focusing fluid is introduced rotationally asymmetrically from three focusing fluid channels 722a, 722b, and 722d into a confluence region of a singulator 717 at three ports instead of four ports.

Figure 22:
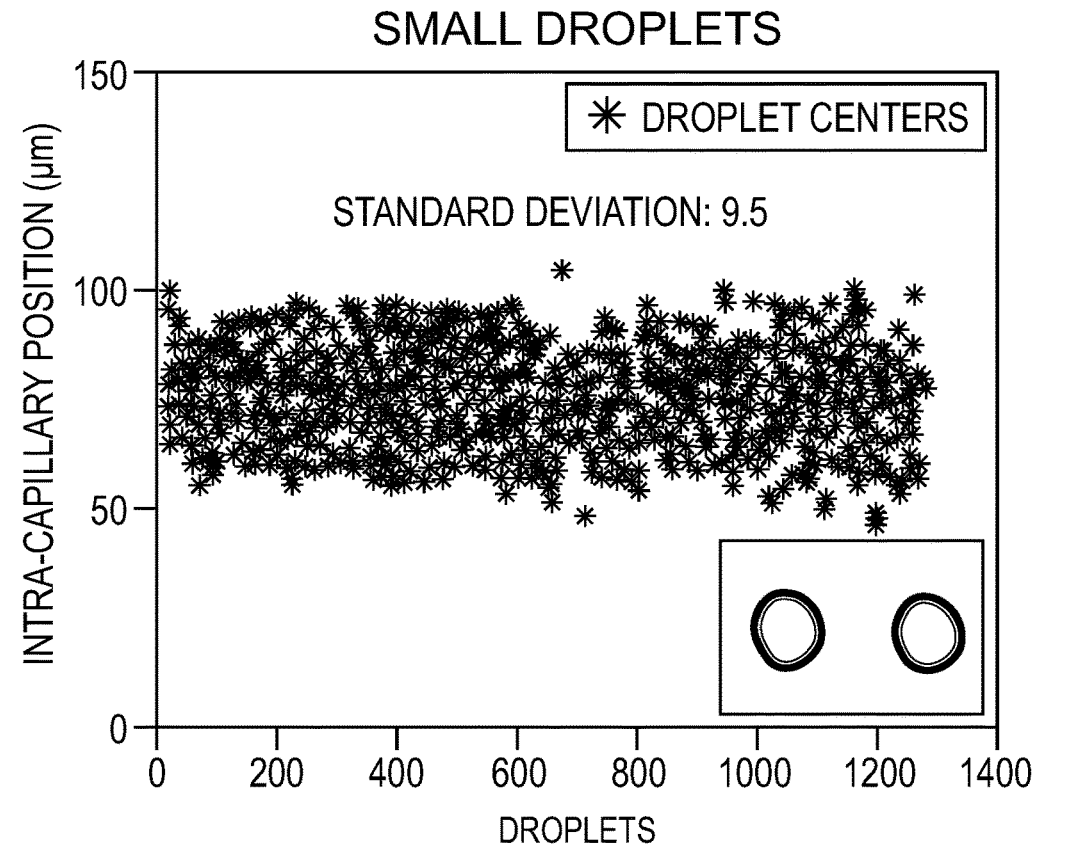
FIG. 22 is a graph of positional data collected from small droplets with the three-port detection system of FIG. 21, generally as in FIG. 16.

FIG. 22 shows a graph of intra-capillary positional data collected from about 1300 small droplets with three-port detection system 700 of FIG. 21, generally as in FIG. 16. The small droplets have vertical positions that are distributed across about 50 micrometers, with a standard deviation of 9.5. Accordingly, the asymmetrical three-port configuration of detection system 700 provides a droplet alignment that does not appear to be much better than that of the symmetrical configuration of detection system 600 of FIG. 15. The net lateral force applied by the three streams of focusing fluid on the stream of sample fluid is horizontal, to produce a horizontal radial offset of droplet position with much less effect on vertical positioning. In other words, the camera of the detection station is not arranged to detect changes in horizontal position of the droplets.

Figure 23:
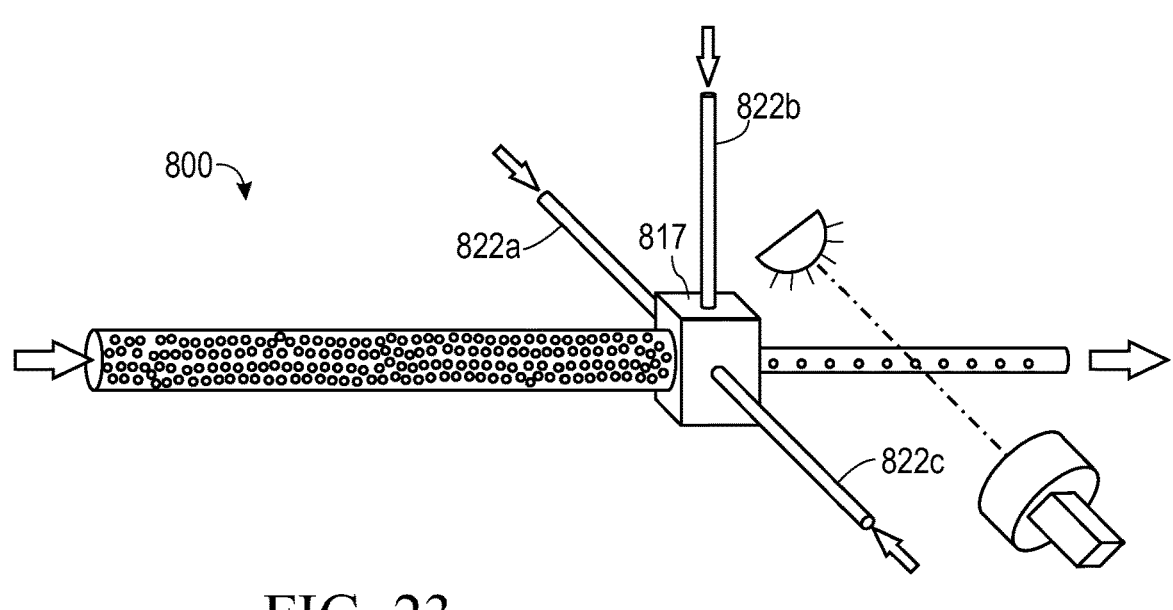
FIG. 23 is a view of another working model of a "three-port" detection system for droplets (as particles), generally as in FIG. 21, except that the three ports, collectively, of FIG. 23 are rotationally offset by 90 degrees about the longitudinal axis of the sample outlet channel relative to the three ports of FIG. 21.

FIG. 23 shows a working model of another "three-port" detection system 800 for droplets. Detection system 800 is identical to three-port detection system 700 of FIG. 21, except that focusing fluid is introduced rotationally asymmetrically from three focusing fluid channels 822a, 822b, and 822c into a confluence region of a singulator 817 at three ports that are rotationally offset by 90 degrees from those of singulator 717.

Figure 24:
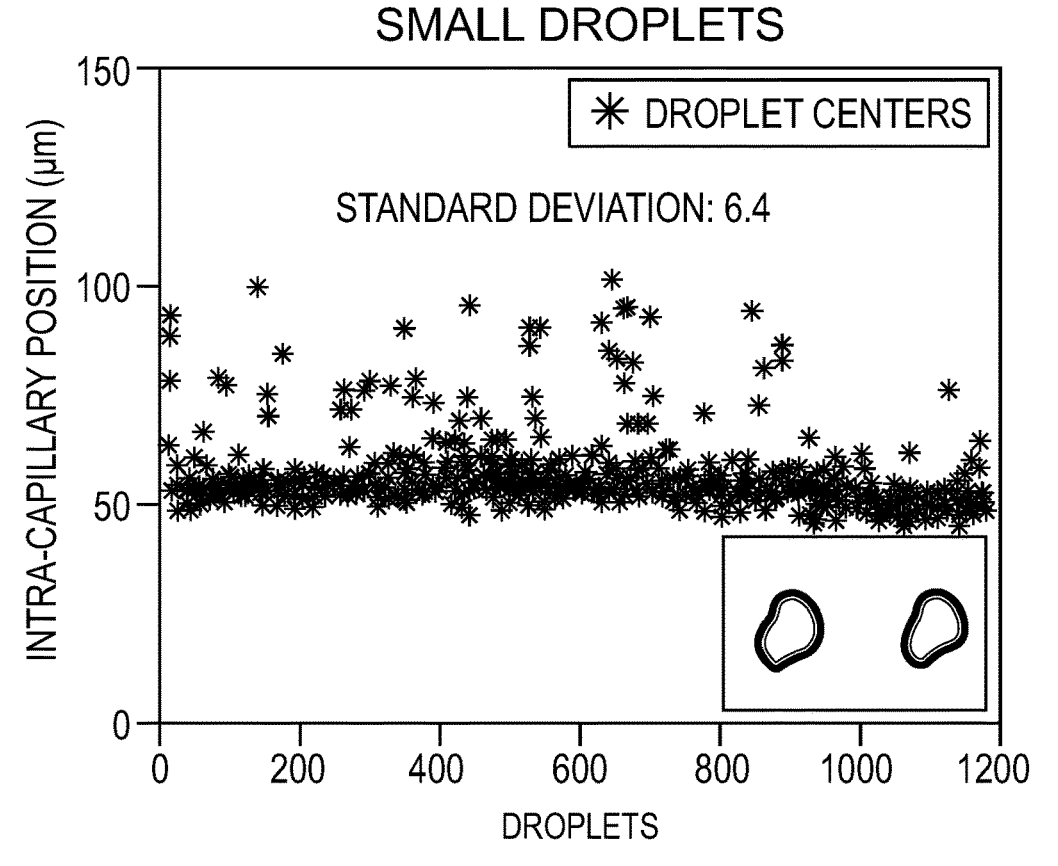
FIG. 24 is a graph of positional data collected from small droplets with the three-port detection system of FIG. 23, generally as in FIG. 16.

FIG. 24 shows a graph of intra-capillary positional data collected from about 1200 small droplets with three-port detection system 800 of FIG. 23, generally as in FIG. 16. The small droplets have vertical positions that generally clustered at an intra-capillary position of 50 micrometers, with moderate upward scatter to a position of 100 micrometers, to produce a standard deviation of 6.4. Accordingly, the asymmetrical three-port configuration of detection system 800 provides a droplet alignment that is detectably better than that of the symmetrical configuration of detection system 600 of FIG. 15. The net lateral force applied by the three streams of focusing fluid on the stream of sample fluid is vertical, to produce a vertically downward, radial offset of droplet position that is efficiently detected by the camera of the system's detection station. Most of the droplets are positioned adjacent a lower portion of the boundary layer. This suggests that the net lateral force from the focusing fluid, which urges the droplets against the boundary layer, is dominant to other forces that encourage lateral migration and bouncing of the droplets in a symmetrical configuration for focusing fluid injection (as in FIGS. 15 and 16). The majority of the droplets appear to slide along the lower portion of the boundary layer when viewed with high-speed video.

Figure 25:
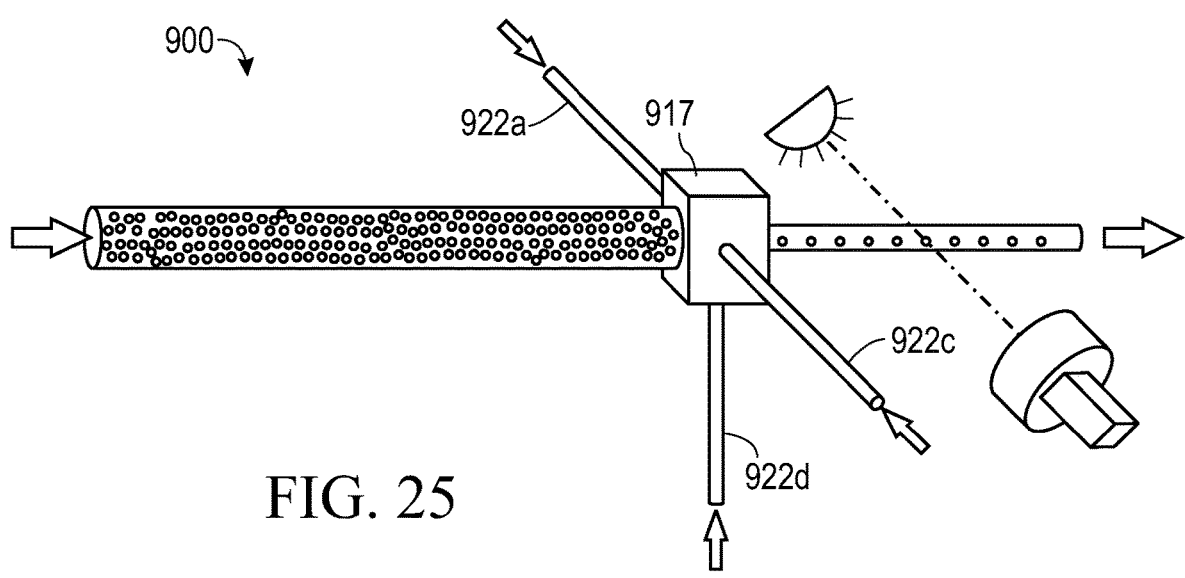
FIG. 25 is a view of still another working model of a "three-port" detection system for droplets (as particles), generally as in FIG. 23, except that the three ports, collectively, of FIG. 25 are rotationally offset by 180 degrees about the longitudinal axis of the sample outlet channel relative to the three ports of FIG. 23.

FIG. 25 shows a working model of yet another "three-port" detection system 900 for droplets. Detection system 900 is identical to three-port detection system 800 of FIG. 23, except that focusing fluid is introduced asymmetrically from three focusing fluid channels 922a, 922c, and 922d into a confluence region of a singulator 917 at three ports that are rotationally offset by 180 degrees from those of singulator 817 in FIG. 23.

Figure 26:
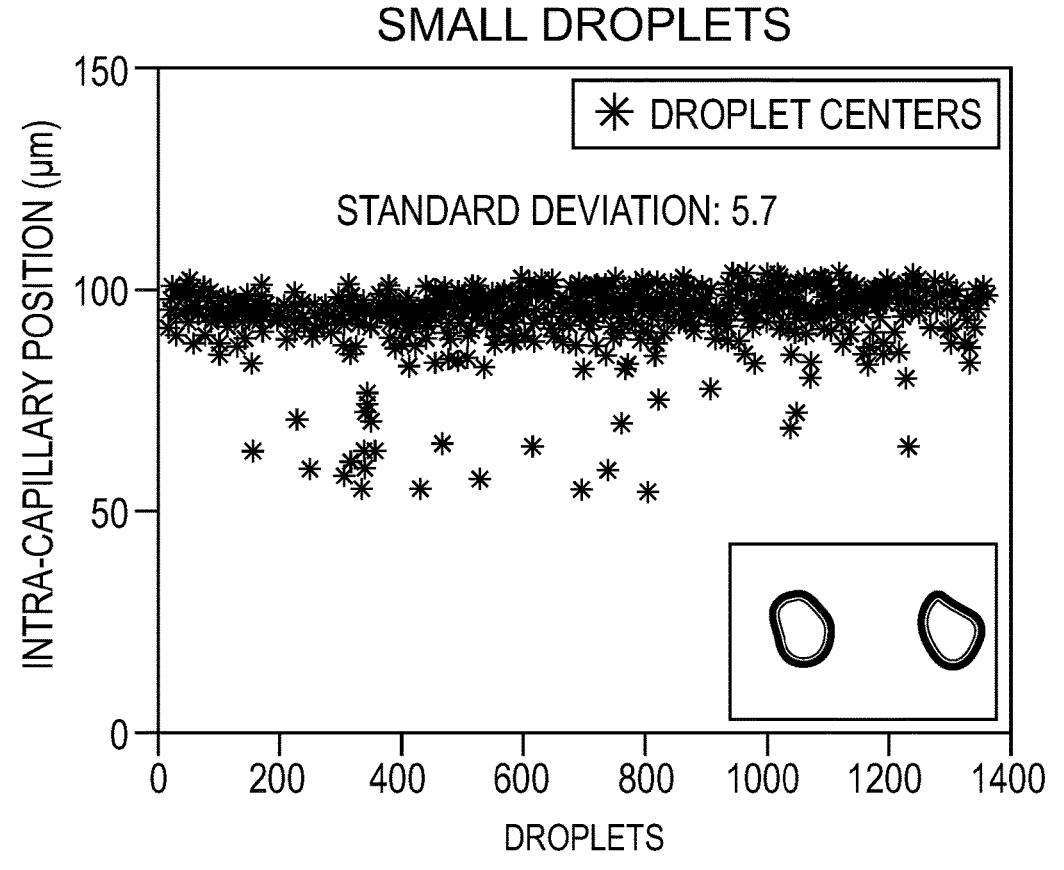
FIG. 26 is a graph of positional data collected from small droplets with the three-port detection system of FIG. 25, generally as in FIG. 16.

FIG. 26 shows a graph of intra-capillary positional data collected from about 1400 small droplets with three-port detection system 900 of FIG. 25, generally as in FIG. 16. The small droplets have vertical positions that generally clustered at an intra-capillary position of 100 micrometers, with moderate downward scatter to a position of 50 micrometers, to produce a standard deviation of 5.7. Accordingly, the asymmetrical three-port configuration of detection system 900 provides a droplet alignment that is detectably better than that of the symmetrical configuration of detection system 600 of FIG. 15. The net lateral force applied by the three streams of focusing fluid on the stream of sample fluid is vertical, to produce a vertically upward, radial offset of droplet position that is efficiently detected by the camera of the system's detection station. Most of the droplets are positioned adjacent an upper portion of the boundary layer, which suggests that the net lateral force from the focusing fluid that urges the droplets against the boundary layer is dominant to other forces that encourage lateral migration and bouncing of the droplets in a symmetrical configuration for focusing fluid injection (as in FIGS. 15 and 16). The majority of the droplets appear to slide along the upper portion of the boundary layer when viewed with high-speed video.

Figure 27:
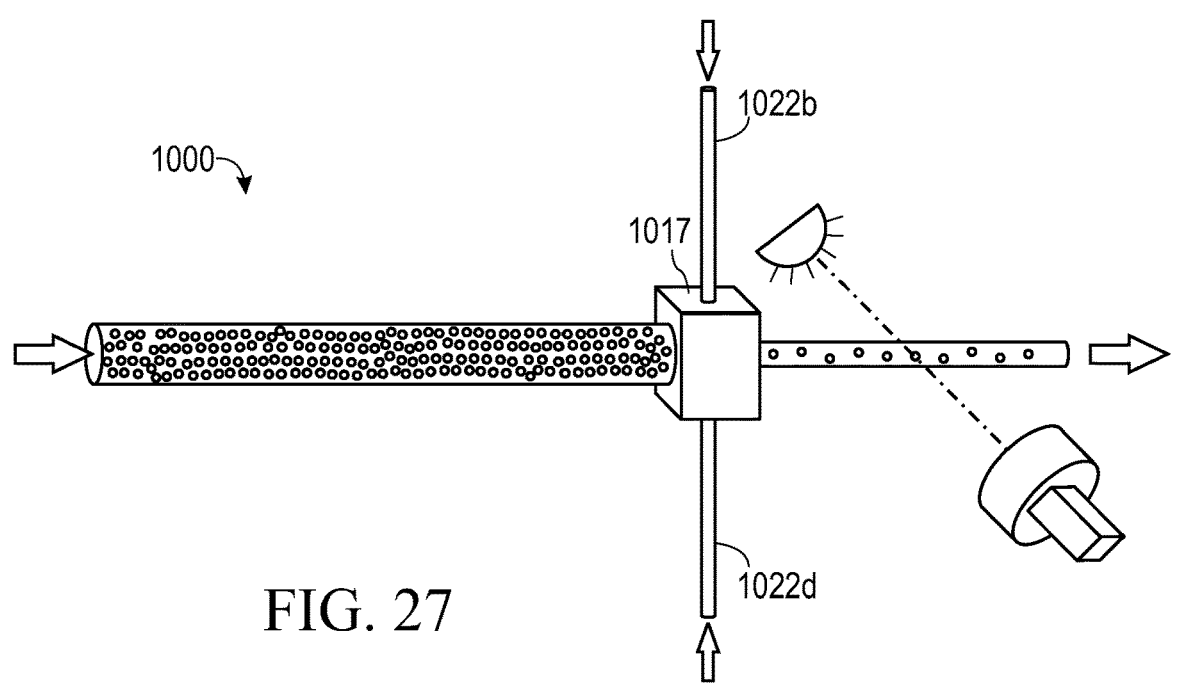
FIG. 27 is a view of a working model of a "two-port" detection system for droplets (as particles), generally as in FIG. 15, except that focusing fluid is introduced symmetrically into a confluence region at two ports instead of four ports.

FIG. 27 shows a working model of a symmetrical "two-port" detection system 1000 for droplets. Detection system 1000 is identical to symmetrical four-port detection system 600 of FIG. 15, except that focusing fluid is introduced symmetrically from only two focusing fluid channels 1022b and 1022d into a confluence region of a singulator 1017 at two ports that are vertically aligned with one another.

Figure 28:
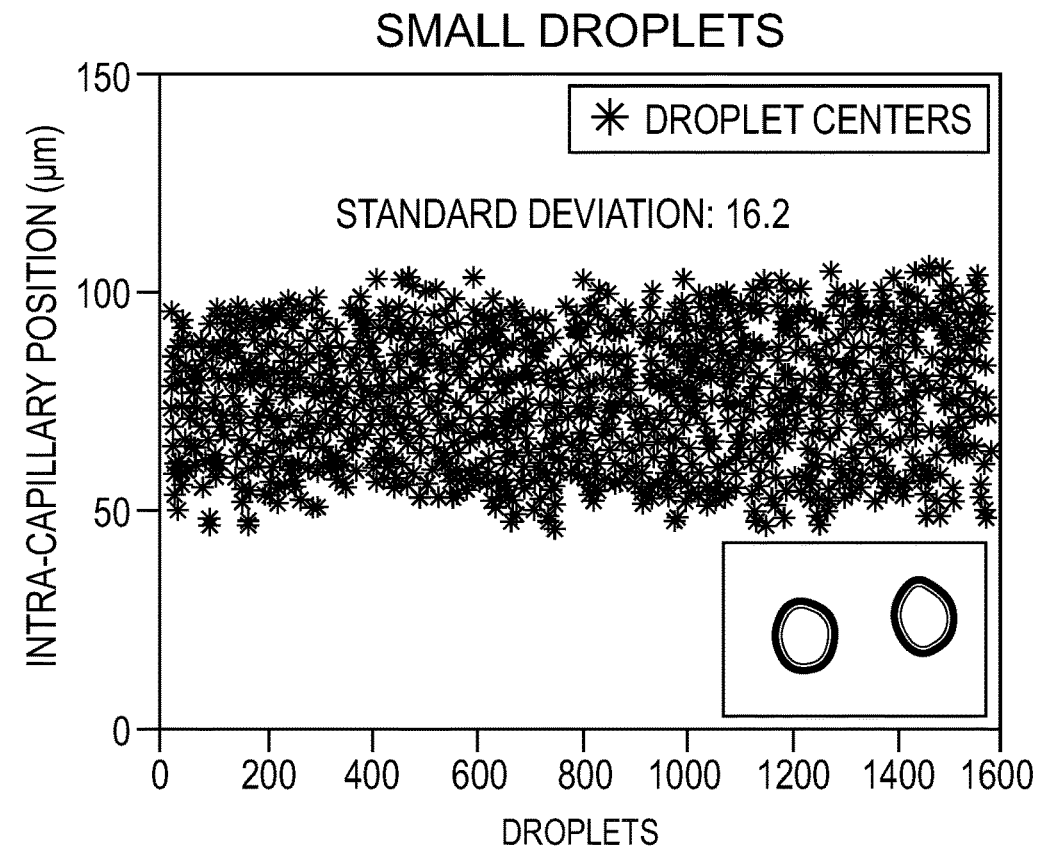
FIG. 28 is a graph of positional data collected from small droplets with the two-port detection system of FIG. 27, generally as in FIG. 16.

FIG. 28 is a graph of intra-capillary positional data collected from about 1600 small droplets with two-port detection system 1000 of FIG. 27, generally as in FIG. 16. The small droplets have centers that are scattered between intra-capillary positions of 50 micrometers and 100 micrometers, with a standard deviation of 16.2. Accordingly, symmetrical two-port detection system 1000 produces results similar to those from symmetrical four-port detection system 600 of FIGS. 15 and 16.

Figure 29:
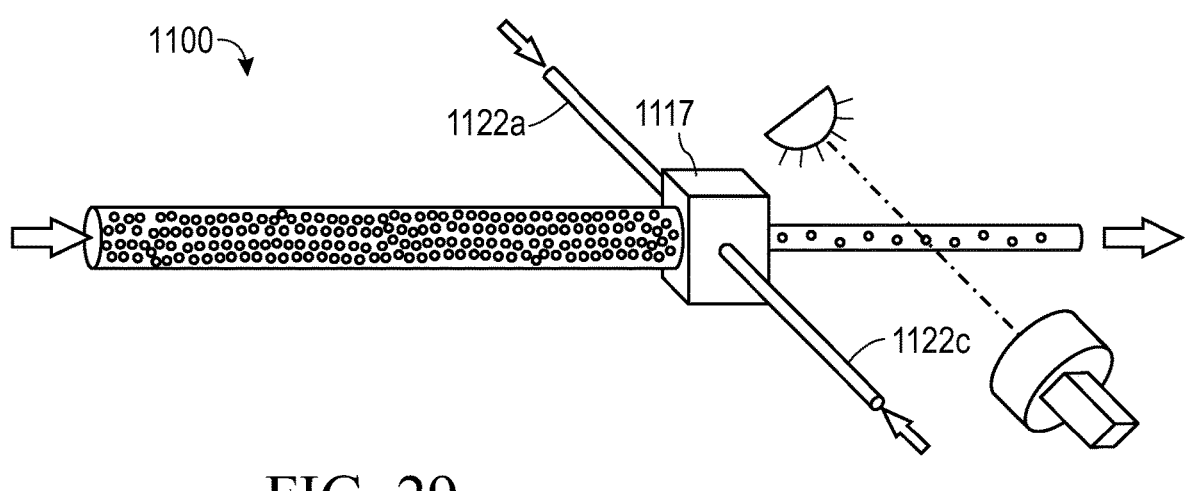
FIG. 29 is a view of another working model of a "two-port" detection system for droplets (as particles), generally as in FIG. 27, except that the two ports, collectively, of FIG. 29 are rotationally offset by 90 degrees about the longitudinal axis of the sample outlet channel relative to the two ports of FIG. 27.

FIG. 29 shows a working model of a symmetrical "two-port" detection system 1100 for droplets. Detection system 1100 is identical to symmetrical two-port detection system 1000 of FIG. 28, except that focusing fluid is introduced symmetrically from two focusing fluid channels 1122a and 1122c into a confluence region of a singulator 1117 at two ports that are horizontally aligned with one another.

Figure 30:
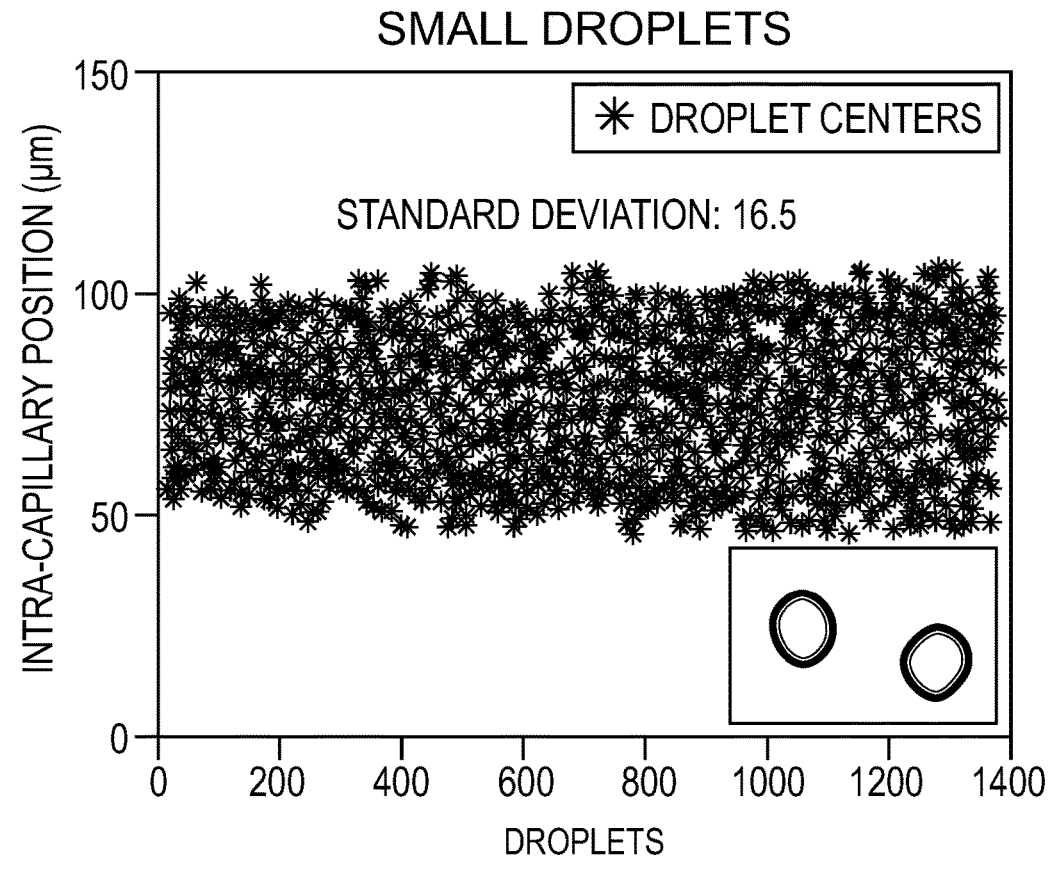
FIG. 30 is a graph of positional data collected from small droplets with the two-port detection system of FIG. 29, generally as in FIG. 16.

FIG. 30 is a graph of intra-capillary positional data collected from about 1400 small droplets with two-port detection system 1100 of FIG. 29, generally as in FIG. 16. The small droplets have centers that are scattered between intra-capillary positions of 50 micrometers and 100 micrometers, with a standard deviation of 16.5. Accordingly, symmetrical two-port detection system 1100 produces results similar, if not worse, than symmetrical two-port detection system 1000 of FIGS. 27 and 28.

Figure 31:
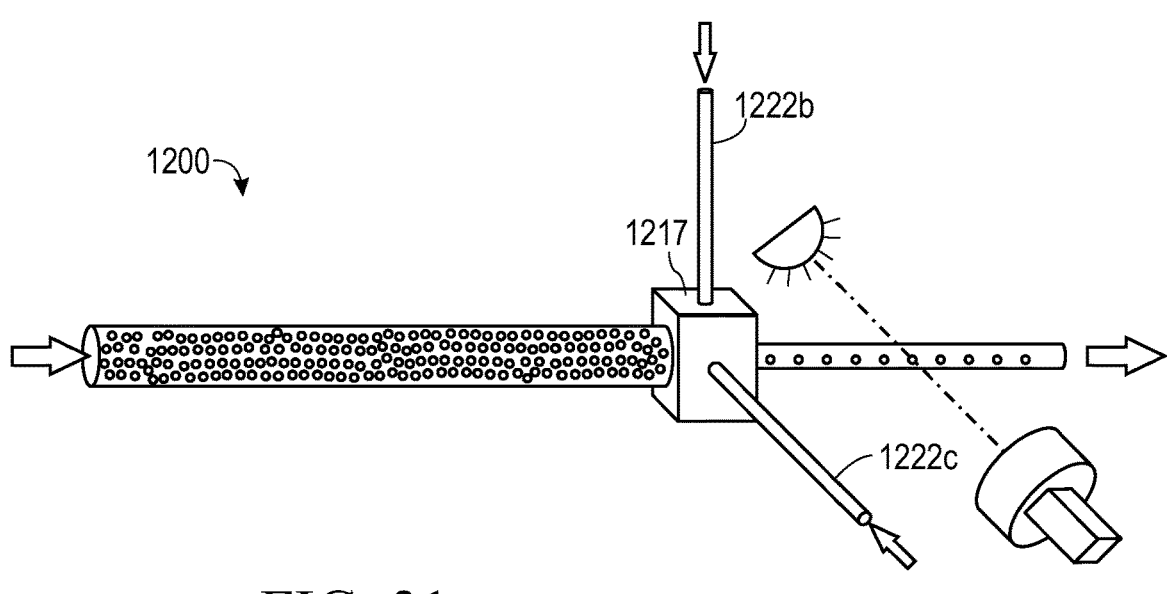
FIG. 31 is a view of another working model of a "two-port" detection system for droplets (as particles), generally as in FIG. 27, except that the two ports of FIG. 31 are rotationally offset from one another by only 90 degrees about the longitudinal axis of the sample outlet channel.

FIG. 31 shows a working model of an asymmetrical "two-port" detection system 1200 for droplets. Detection system 1200 is identical to three-port detection system 800 of FIG. 23, except that focusing fluid is introduced asymmetrically from only two focusing fluid channels 1222b and 1222c into a confluence region of a singulator 1217 at two ports that are rotationally offset from one another by 90 degrees.

Figure 32:
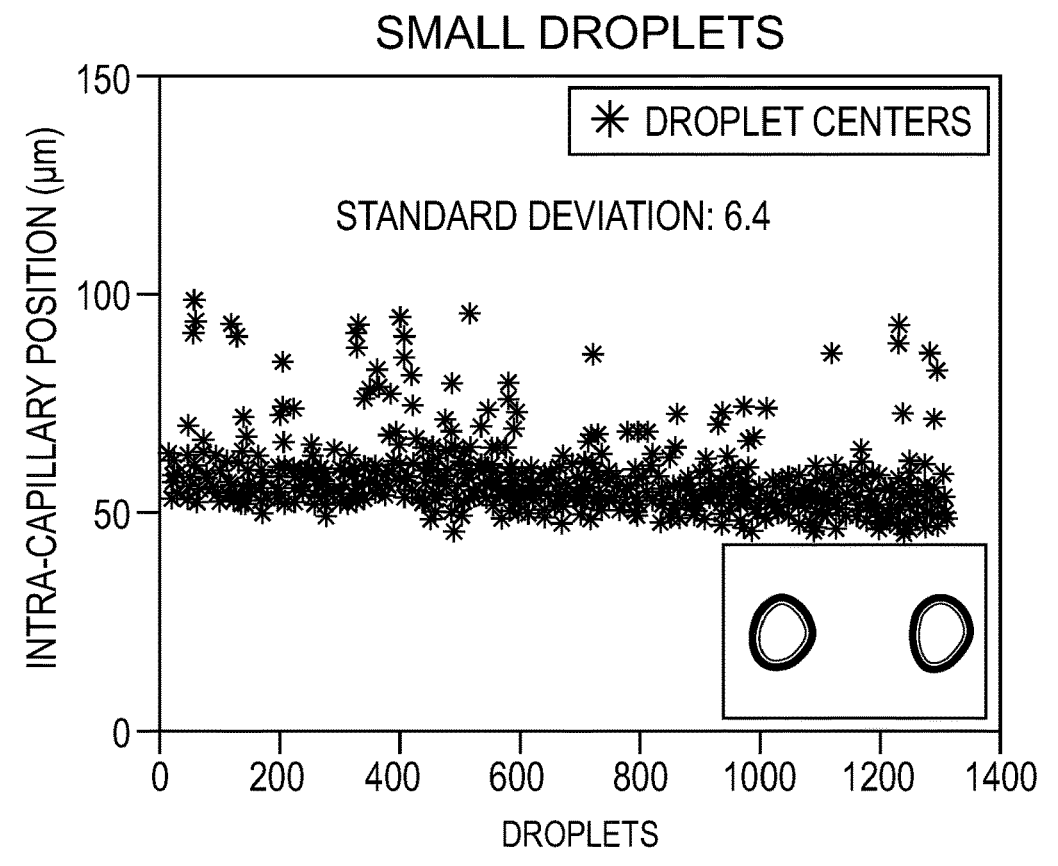
FIG. 32 is a graph of positional data collected from small droplets with the two-port detection system of FIG. 31, generally as in FIG. 16.

FIG. 32 shows a graph of intra-capillary positional data collected from about 1300 small droplets with two-port detection system 1200 of FIG. 31, generally as in FIG. 16. The small droplets have vertical positions that generally clustered at an intra-capillary position of about 60 micrometers, with moderate upward scatter to a position of 90 micrometers, to produce a standard deviation of 6.4. Accordingly, the asymmetrical two-port configuration of detection system 1200 provides a droplet alignment that is detectably better than that of the symmetrical configuration of detection system 600 of FIG. 15. The net lateral force applied by the two streams of focusing fluid on the stream of sample fluid is angled downward at 45 degrees, which produces a radial offset of droplet position that is efficiently detected by the camera of the system's detection station.

Figure 33:
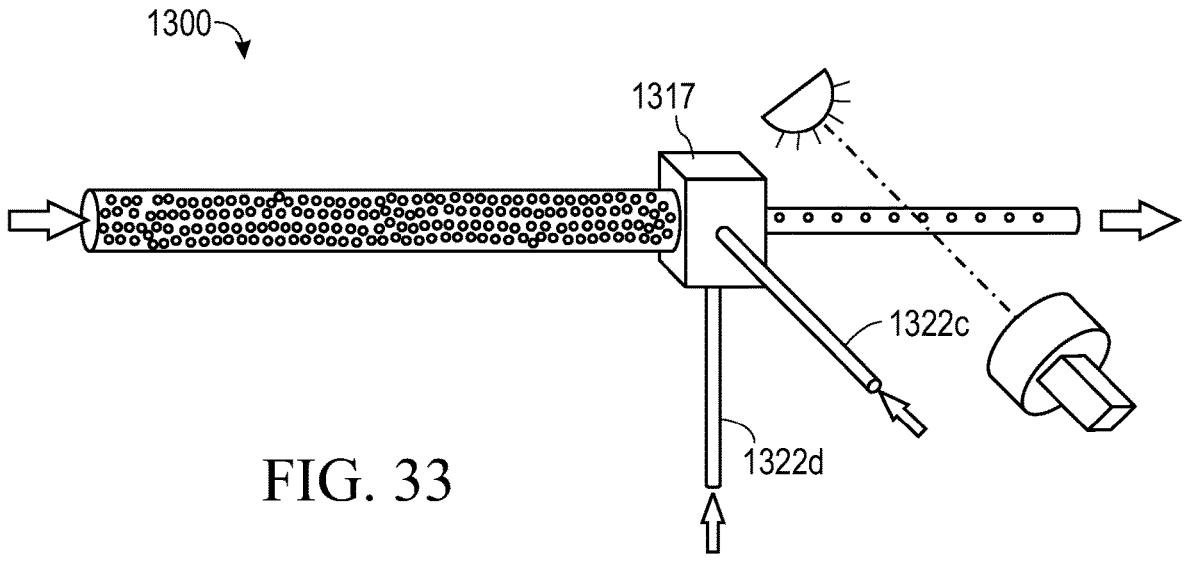
FIG. 33 is a view of still another working model of a "two-port" detection system for droplets (as particles), generally as in FIG. 31, except that the two ports, collectively, of FIG. 33 are rotationally offset by 90 degrees about the longitudinal axis of the sample outlet channel relative to the two ports of FIG. 31.

FIG. 33 shows a working model of another asymmetrical "two-port" detection system 1300 for droplets. Detection system 1300 is identical to two-port detection system 1200 of FIG. 31, except that focusing fluid is introduced asymmetrically from two focusing fluid channels 1322c and 1322d into a confluence region of a singulator 1317 at two ports that are rotationally offset by 90 degrees relative to those of detection system 1200 of FIG. 31.

Figure 34:
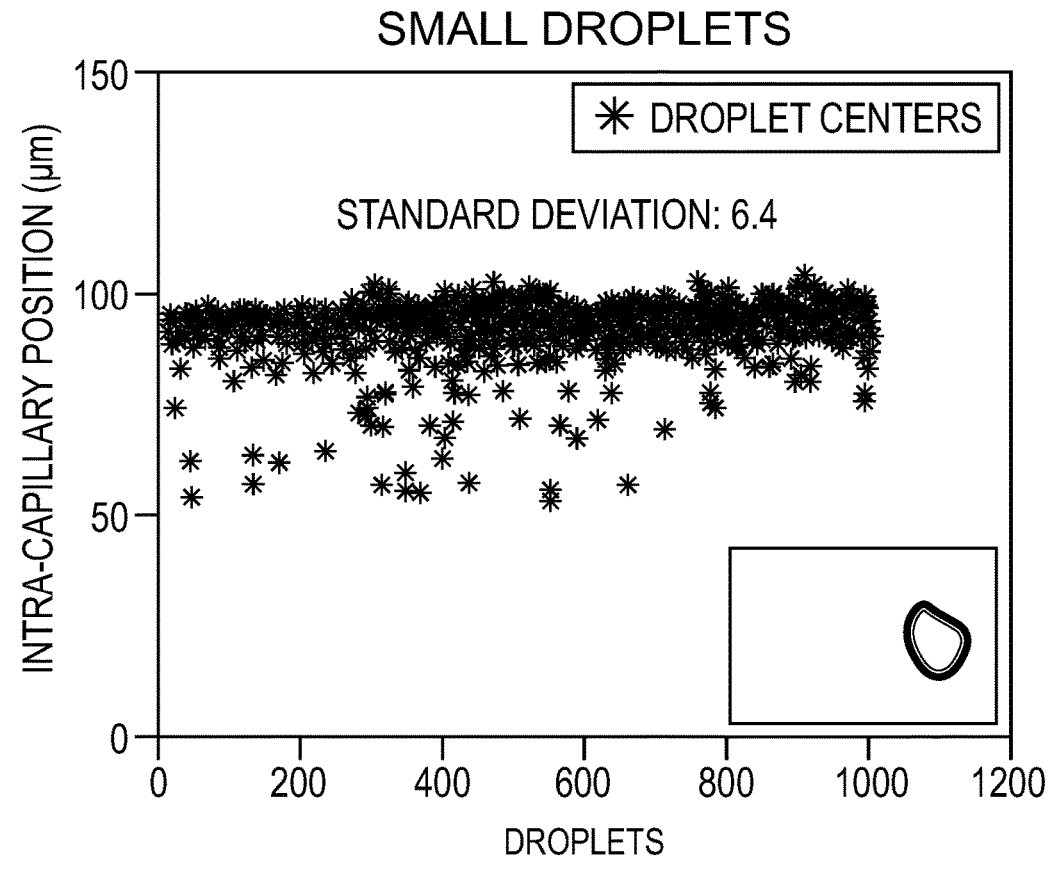
FIG. 34 is a graph of positional data collected from small droplets with the two-port detection system of FIG. 33, generally as in FIG. 16.

FIG. 34 shows a graph of intra-capillary positional data collected from about 1000 small droplets with two-port detection system 1300 of FIG. 33, generally as in FIG. 16. The small droplets have vertical positions that generally clustered at an intra-capillary position of about 90 micrometers, with moderate downward scatter to a position of 60 micrometers, to produce a standard deviation of 6.4. Accordingly, the asymmetrical two-port configuration of detection system 1300 provides a droplet alignment that is detectably better than that of the symmetrical configuration of detection system 600 of FIG. 15. The net lateral force applied by the two streams of focusing fluid on the stream of sample fluid is angled upward at 45 degrees, which produces a radial offset of droplet position that is efficiently detected by the camera of the system's detection station.

Figure 35:
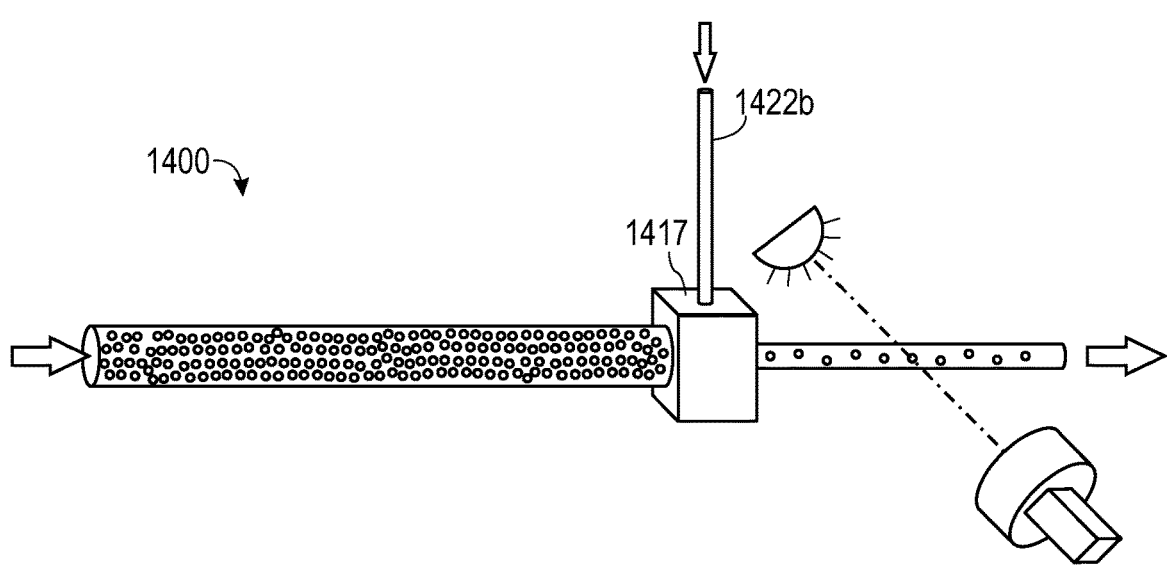
FIG. 35 is a view of a working model of a "one-port" detection system for droplets (as particles), generally as in FIG. 15, except that focusing fluid is introduced asymmetrically into a confluence region at one port instead of four ports.

FIG. 35 shows a working model of an asymmetrical "one-port" detection system 1400 for droplets. Detection system 1400 introduces focusing fluid asymmetrically, in a vertically downward direction, from only one focusing fluid channel 1422b into a confluence region of a singulator 1417 at only one port.

Figure 36:
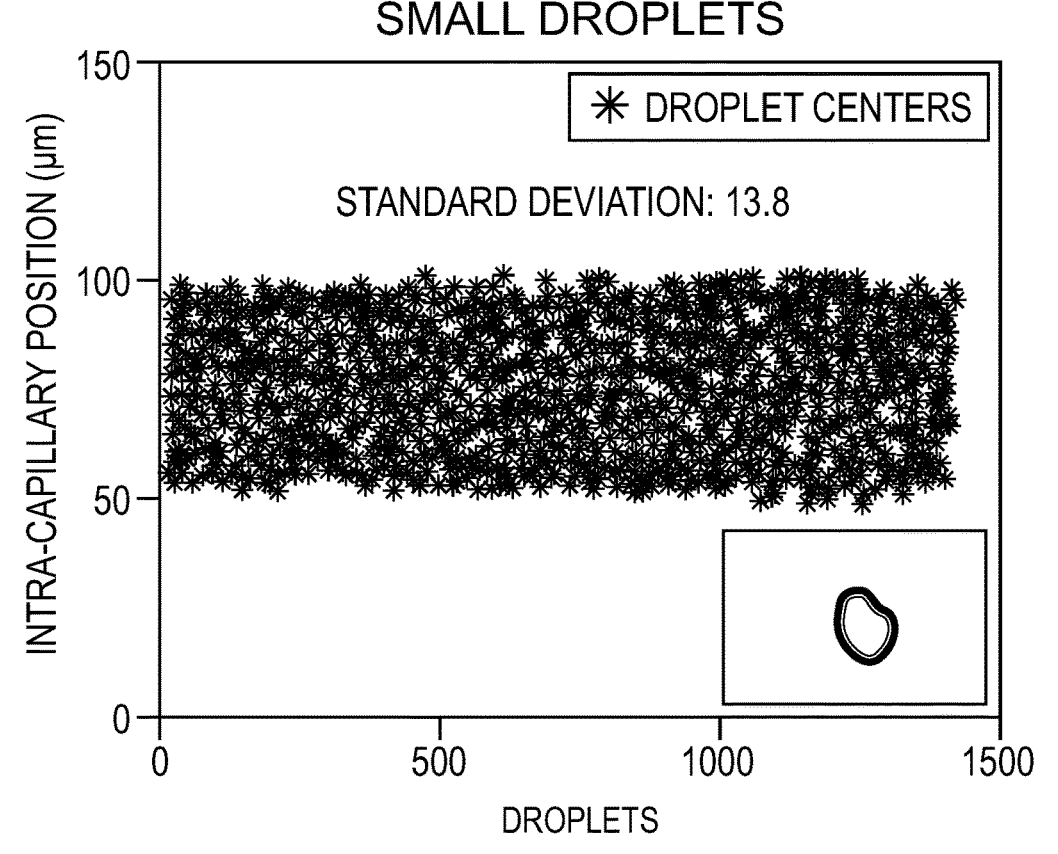
FIG. 36 is a graph of positional data collected from small droplets with the one-port detection system of FIG. 35, generally as in FIG. 16.

FIG. 36 shows a graph of intra-capillary positional data collected from about 1400 small droplets with one-port detection system 1400 of FIG. 35, generally as in FIG. 16. The small droplets have vertical positions that are scattered across almost 50 micrometers of the capillary tube, to produce a standard deviation of 13.8. Accordingly, the asymmetrical one-port configuration of detection system 1400 provides a droplet alignment that is not much better than that from the symmetrical configuration of detection system 600 of FIG. 15.

Figure 37:
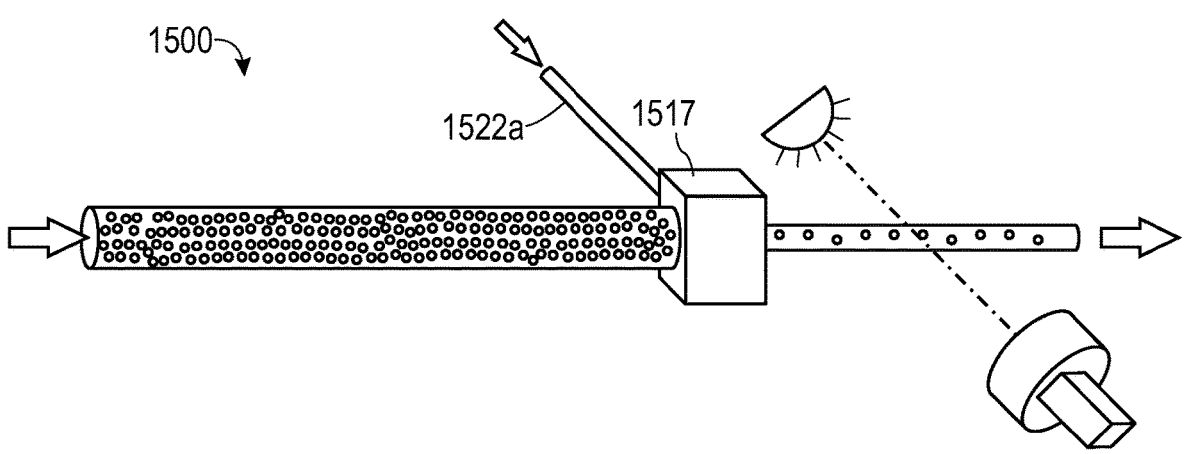
FIG. 37 is a view of another working model of a "one-port" detection system for droplets (as particles), generally as in FIG. 35, except that the one port of FIG. 37 is rotationally offset by 90 degrees about the longitudinal axis of the sample outlet channel relative to FIG. 35.

FIG. 37 shows a working model of an asymmetrical "one-port" detection system 1500 for droplets. Detection system 1500 introduces focusing fluid asymmetrically, in a horizontal direction, from only one focusing fluid channel 1522a into a confluence region of a singulator 1517 at only one port.

Figure 38:
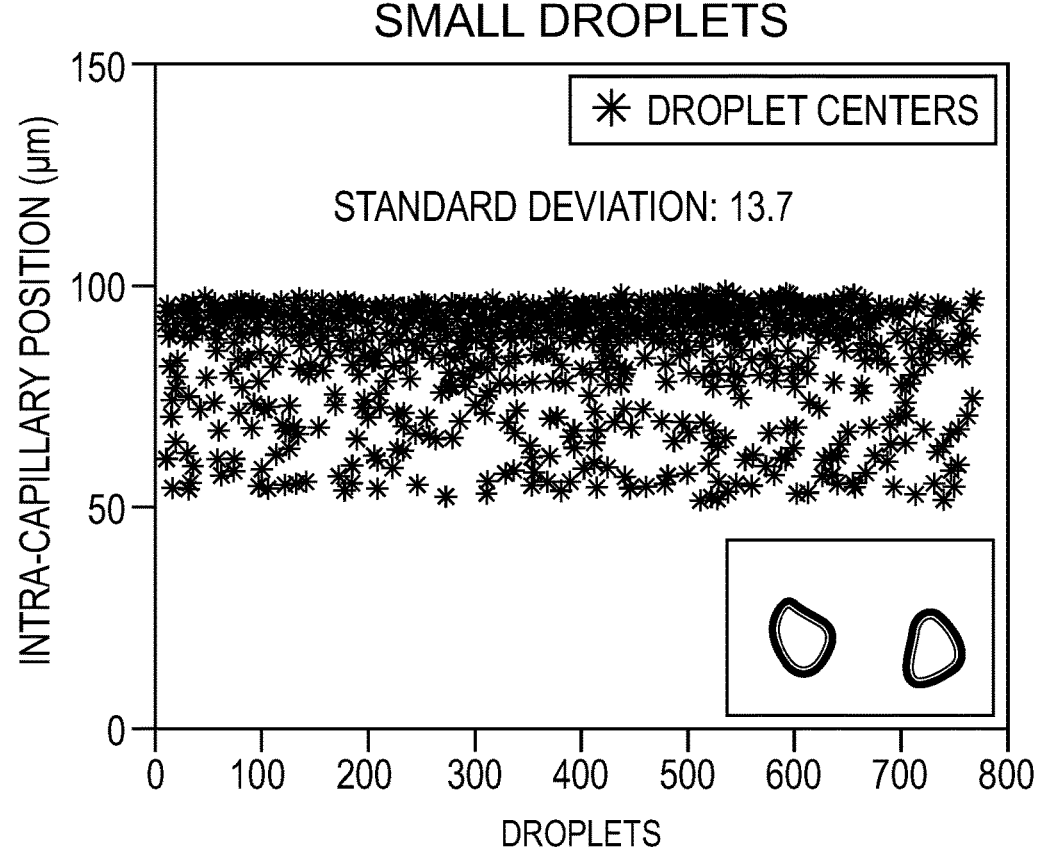
FIG. 38 is a graph of positional data collected from small droplets with the one-port detection system of FIG. 37, generally as in FIG. 16.
Figure 39:
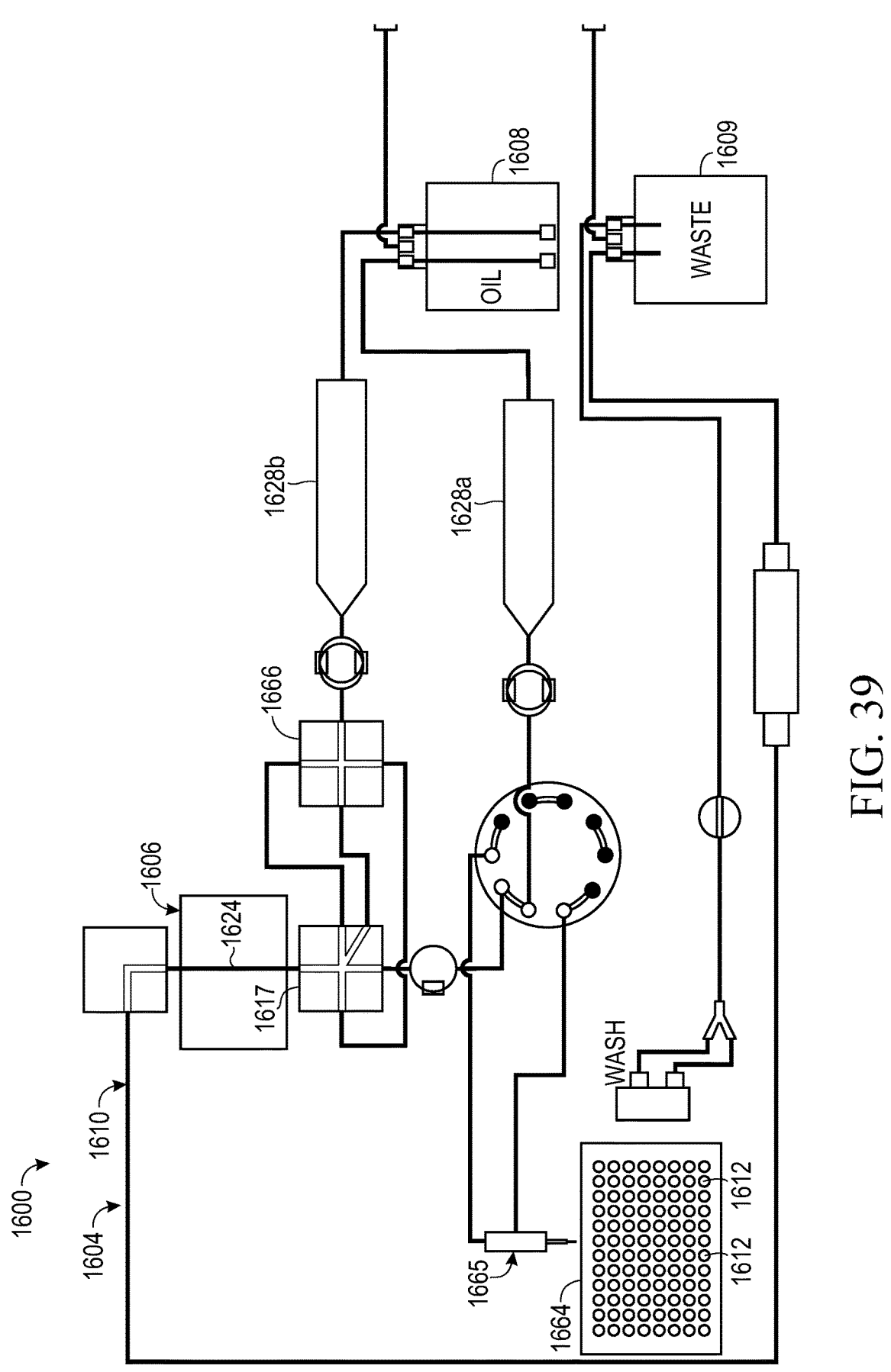
FIG. 39 is a fluidics diagram of an exemplary asymmetrical three-port detection system for droplets.

FIG. 38 shows a graph of intra-capillary positional data collected from about 750 small droplets with one-port detection system 1500 of FIG. 37, generally as in FIG. 16. The small droplets have vertical positions that are scattered across almost 50 micrometers of the capillary tube, to produce a standard deviation of 13.7. Accordingly, the asymmetrical one-port configuration of detection system 1500 provides a droplet alignment that is not much better than that of the symmetrical configuration of detection system 600 of FIG. 15.

Buoyancy and hydrodynamic forces can work cooperatively to focus droplets or other particles having a lesser or greater density than the carrier fluid (and/or focusing fluid). Focusing fluid can be introduced asymmetrically, with a net lateral force that is upward or downward, such as vertical (i.e., in a direction that is parallel to gravity), to improve particle focusing.

Four-port symmetric detection system 600 of FIG. 15, asymmetrical three-port detection system 800 of FIG. 23, and asymmetrical two-port detection system 1200 of FIG. 31 were compared using sets of small droplets loaded with FAM, CY5, ROX, HEX, CY5.5, or ATTO590 fluorescent dye. The coefficient of variation (CV) for the fluorescence amplitude measured from each set of small droplets with each system was determined. Three-port detection system 800 produced the smallest amplitude CV, followed by two-port detection system 1200. Four-port detection system 600 performed the worst.

D. Fluidics Diagram and Singulator

This subsection describes an exemplary fluidics diagram and asymmetric three-port singulator 1617 for a droplet detection system 1600; see FIGS. 39-42.

Detection system 1600 includes a fluidics subsystem 1604 intersecting a detection station 1606, as described above in Subsections A and C. Fluidics subsystem 1604 moves fluid into, through, and out of a channel network 1610 using a sample pump 1628a and a focusing pump 1628b. Each sample fluid 1612 is aspirated from a well of a multi-well microplate 1664 into channel network 1610 using a pickup tip assembly 1665 in conjunction with sample pump 1628a. The sample pump also drives each sample fluid into singulator 1617. Oil is drawn from a focusing reservoir 1608 by focusing pump 1628b and then driven by the pump through a splitter 1666 and into three ports of singulator 1617. The sample fluid and oil flow through detection station 1606 in a sample outlet channel 1624, and then into a waste receptacle 1609.

Figure 40:
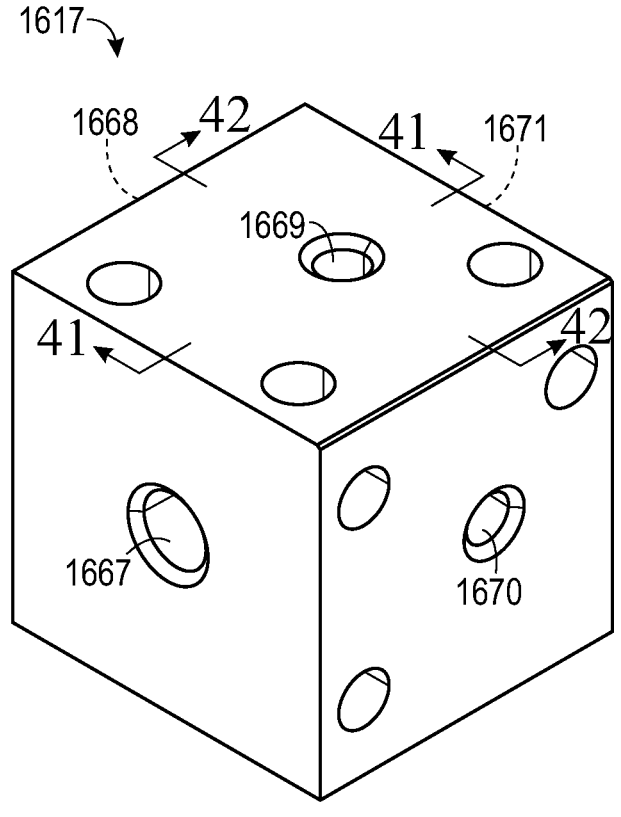
FIG. 40 is an isometric view of a singulator device of the three-port detection system of FIG. 39.
Figures 41, 42:
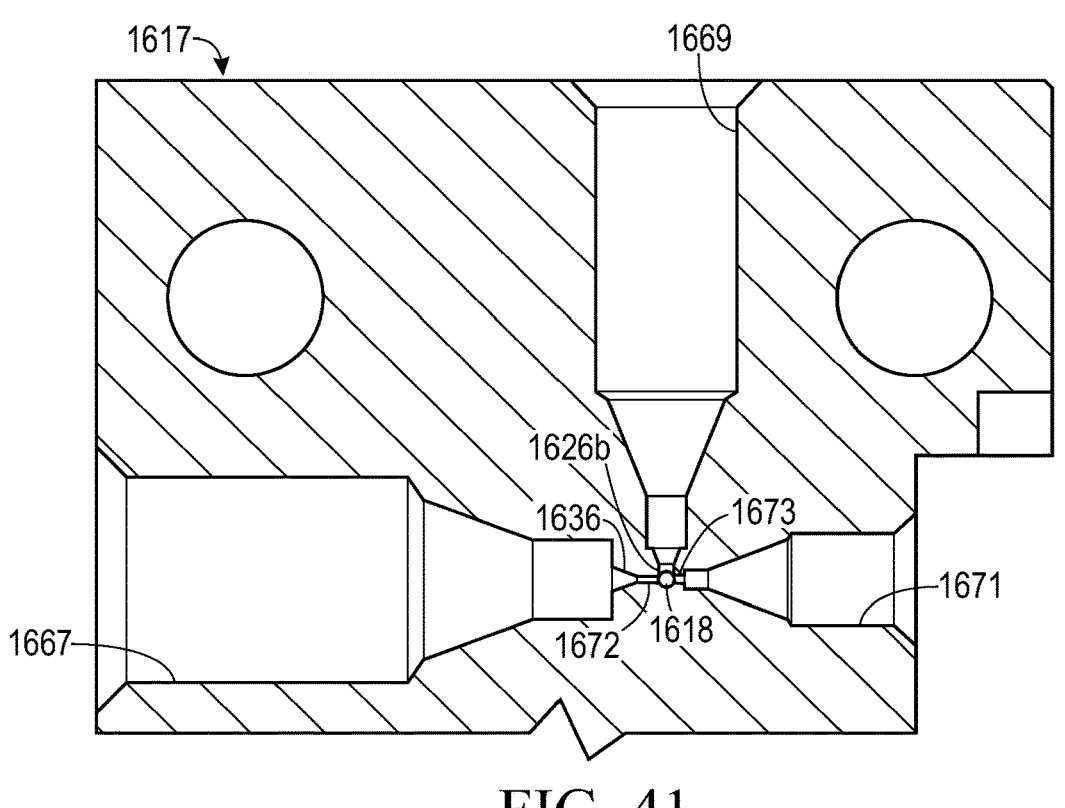
FIG. 41 is a sectional view of the singulator device of FIG. 40, taken generally along line 41-41 of FIG. 40.
FIG. 42 is another sectional view of the singulator device of FIG. 40, taken generally along line 42-42 of FIG. 40.

FIGS. 40-42 show isometric and sectional views of singulator 1617. The singulator has a monolithic body defining a plurality of internally-threaded openings 1667-1671 that extend inward from surfaces of the body and join one another at a confluence region 1618 inside the body. Each opening 1667-1671 is configured to receive an externally threaded fitting holding an end of a tube or tubing on which is disposed a ferrule. The inner end of opening 1667 forms a tapered region 1636 upstream of a sample inlet 1672, which joins confluence region 1618. The inner ends of openings 1668-1670 respectively form focusing fluid ports 1626a-1626c, which join confluence region 1618. The inner end of opening 1671 forms a sample outlet 1673, which is connected to a separate capillary tube that forms a sample outlet channel including an interrogation zone, as described elsewhere herein.

IV. Illustrative Combinations and Additional Examples

This section describes additional aspects and features of the methods and systems of the present disclosure, presented without limitation as a series of paragraphs, some or all of which may be alphanumerically indexed for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A method of detecting particles, the method comprising: (i) driving a sample fluid including the particles from a sample inlet channel, through a confluence region, and into a sample outlet channel defining a longitudinal axis; (ii) introducing focusing fluid into the confluence region from at least two focusing channels along respective introduction axes, wherein introducing is rotationally asymmetrical about the longitudinal axis, and wherein the introduction axes and the longitudinal axis collectively extend in three dimensions; (iii) passing the particles through an interrogation zone of the sample outlet channel; (iv) irradiating the interrogation zone with light; and (iv) detecting optical radiation from the interrogation zone.

A2. The method of paragraph A1, wherein each of the introduction axes is orthogonal to the longitudinal axis.

A3. The method of paragraph A1 to A2, wherein introducing includes introducing the focusing fluid into the confluence region from each focusing channel at a respective flow rate that remains constant, regardless of the optical radiation detected.

A4. The method of any of paragraphs A1 to A3, wherein introducing includes introducing the focusing fluid into the confluence region at the same flow rate from each focusing channel.

A5. The method of any of paragraphs A1 to A4, further comprising transporting each of the particles to the same waste receptacle from the sample outlet channel, regardless of the optical radiation detected.

A6. The method of any of paragraphs A1 to A5, wherein introducing the focusing fluid concentrates the particles into a smaller particle localization zone within the sample outlet channel than would occur by introducing the focusing fluid in a rotationally symmetrical manner about the longitudinal axis, everything else being equal.

A7. The method of any of paragraphs A1 to A6, wherein introducing includes creating a boundary layer with the focusing fluid adjacent a wall of the sample outlet channel, wherein the particles are excluded from the boundary layer, and wherein introducing includes urging the particles to the boundary layer such that the particles slide along the boundary layer as the particles travel along the sample outlet channel.

A8. The method of any of paragraphs A1 to A7, wherein the interrogation zone is downstream of, and spaced from, the confluence region.

A9. The method of any of paragraphs A1 to A8, wherein an average position of the particles in the interrogation zone has a radial offset from the longitudinal axis in response to introducing the focusing fluid into the confluence region.

A10. The method of paragraph A9, wherein the sample outlet channel has a radius at the interrogation zone, and wherein the radial offset is at least 10%, 15%, 20%, or 25% of the radius.

A11. The method of paragraph A9 or A10, wherein the particles have a radius, and wherein the radial offset is at least 20%, 25%, 30%, or 40% of an average value of the radius of the particles.

A12. The method of any of paragraphs A9 to A11, wherein irradiating is performed on an irradiation axis, and wherein the radial offset is in a direction that is within 20 degrees of orthogonal to the irradiation axis.

A13. The method of paragraph A12, wherein the radial offset is orthogonal to the irradiation axis.

A14. The method of any of paragraphs A1 to A13, wherein introducing includes applying a net force on the sample fluid with the focusing fluid in a direction transverse to the longitudinal axis.

A15. The method of paragraph A14, wherein applying includes applying the net force in a direction that is orthogonal to the longitudinal axis.

A16. The method of paragraph A14 or A15, wherein the net force is a radially-oriented force.

A17. The method of any of paragraphs A1 to A16, wherein driving includes driving the particles through a tapered region of the sample inlet channel that tapers toward the confluence region.

A18. The method of any of paragraphs A1 to A17, wherein introducing includes introducing the focusing fluid into the confluence region from the at least two focusing fluid channels through two or more ports.

A19. The method of paragraph A18, wherein introducing includes introducing the focusing fluid into the confluence region through only two ports or at least three ports.

A20. The method of paragraph A19, wherein the focusing fluid is introduced into the confluence region through only two ports, and wherein the respective introduction axes are rotationally offset from one another about the longitudinal axis by 120 degrees or less.

A21. The method of paragraph A18, wherein the focusing fluid is introduced into the confluence region through only three ports, and wherein the respective introduction axes are rotationally offset from one another by 100 degrees or less.

A22. The method of any of paragraphs A1 to A21, wherein the sample outlet channel has a channel diameter at the interrogation zone, and wherein the particles have an average particle diameter that is less than 60% of the channel diameter.

A23. The method of any of paragraphs A1 to A22, wherein the sample outlet channel has a channel diameter at the interrogation zone, and wherein the particles have an average particle diameter that is greater than 20% of the channel diameter.

A24. The method of any of paragraphs A1 to A23, wherein introducing includes forming an asymmetric fluid sheath of the focusing fluid around the sample fluid.

A25. The method of any of paragraphs A1 to A24, wherein the particles are droplets.

A26. The method of any of paragraphs A1 to A24, wherein the particles are biological cells.

A27. The method of any of paragraphs A1 to A26, wherein fluid flow in the sample outlet channel has a Reynolds number between 1 and 2300.

A28. The method of any of paragraphs A1 to A27, wherein driving includes driving the sample fluid into the confluence region at a first volumetric flow rate, and wherein introducing includes introducing the focusing fluid into the confluence region at a second volumetric flow rate that is at least five times the first volumetric flow rate.

A29. The method of any of paragraphs A1 to A28, wherein introducing includes increasing an alignment of the particles with one another along the longitudinal axis.

A30. The method of paragraph A29, wherein the alignment resulting from introducing the focusing fluid is greater than a corresponding alignment of the particles that would be produced by introducing the focusing fluid in a rotationally symmetrical manner about the longitudinal axis, everything else being equal.

A31. The method of any of paragraphs A1 to A30, wherein the sample inlet channel and the sample outlet channel are coaxial with one another.

A32. The method of any of paragraphs A1 to A31, wherein introducing includes increasing an average spacing of the particles from one another along the longitudinal axis.

A33. The method of any of paragraphs A1 to A32, wherein driving and introducing include creating at least one pressure differential that produces flow of the sample fluid and the focusing fluid.

A34. The method of paragraph A33, wherein driving and introducing are performed using one or more positive/negative pressure sources.

A35. The method of paragraph A33 or A34, wherein driving and introducing include operating one or more pumps.

A36. The method of any of paragraphs A1 to A35, wherein passing includes passing the particles serially through the interrogation zone.

A37. The method of any of paragraphs A1 to A36, wherein a monolithic singulator device defines a downstream end of the sample inlet channel, the confluence region, and an upstream end of the sample outlet channel.

A38. The method of any of paragraphs A1 to A37, wherein detecting optical radiation includes detecting fluorescence from the particles.

A39. The method of any of paragraphs A1 to A38, wherein each of the particles is spaced from a wall of the sample outlet channel around the interrogation zone.

A40. The method of any of paragraphs A1 to A3 and A5 to A39, wherein introducing includes introducing the focusing fluid into the confluence region at different flow rates from at least two of the focusing channels.

B1. A method of detecting particles, the method comprising: (i) driving a sample fluid including the particles from a sample inlet channel, through a confluence region, and into a sample outlet channel defining a longitudinal axis; (ii) introducing focusing fluid into the confluence region along two or more introduction axes that collectively have rotational asymmetry about the longitudinal axis; (iii) passing the particles through an interrogation zone of the sample outlet channel; (iv) irradiating the interrogation zone with light; and (v) detecting optical radiation from the interrogation zone.

B2. The method of paragraph B1, further comprising any limitation of paragraphs A1 to A40

C1. A system for detecting particles, the system comprising: (i) a channel network including a confluence region fluidically connecting a sample inlet channel and a sample outlet channel to one another, the sample outlet channel defining a longitudinal axis, the channel network also including at least two focusing fluid channels defining respective introduction axes and fluidically connected to the confluence region at two or more ports, wherein the introduction axes and the longitudinal axis collectively extend in three dimensions; (ii) one or more positive/negative pressure sources operatively connected to the channel network and configured to drive a sample fluid including the particles from the sample inlet channel, through the confluence region, and through an interrogation zone of the sample outlet channel, and to drive introduction of focusing fluid into the confluence region asymmetrically about the longitudinal axis; and (iii) a detection station including a light source configured to irradiate the interrogation zone with light, and also including an optical sensor configured to detect optical radiation from the interrogation zone.

C2. The system of paragraph C1, wherein the channel network includes a monolithic singulator device defining a downstream end of the sample inlet channel, the confluence region, and an upstream end of the sample outlet channel.

C3. The system of paragraph C2, wherein the one or more positive/negative pressure sources include a first pump to drive the sample fluid through confluence region and the interrogation zone and a second pump to drive the focusing fluid into the confluence region.

C4. The system of any of paragraphs C1 to C3, wherein the at least two focusing fluid channels are configured such that an average position of the particles in the interrogation zone has a radial offset from the longitudinal axis.

C5. The system of any of paragraphs C1 to C4, wherein the system is configured meet any of the limitations of paragraphs A1 to A40.

V. Advantages and Benefits

The different examples of methods and systems for detecting particles provide several advantages over known solutions for detecting particles. For example, illustrative examples described herein permit particle sets that differ from one another in particle size, particle composition (e.g., particles with different densities), particle shape, and/or the like, to be detected more accurately and efficiently using the same fluidics layout.

Additionally, and among other benefits, the methods and systems disclosed herein provide more consistent irradiation of a set of particles with light.

Additionally, and among other benefits, the methods and systems disclosed herein provide more uniform excitation of, and thus more informative emission from, a fluorophore(s) associated with a set of particles.

Additionally, and among other benefits, the methods and systems disclosed herein may be utilized in flow cytometry.

Additionally, and among other benefits, the methods and systems disclosed herein may be utilized in particle tracking velocimetry.

No known system or method can perform these functions. However, not all examples described herein provide the same advantages or the same degree of advantage.

VI. Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed:

1. A method of detecting particles, the method comprising:

driving a sample fluid including the particles from a sample inlet channel, through a confluence region, and into a sample outlet channel defining a longitudinal axis;

introducing focusing fluid into the confluence region from at least two focusing channels along respective introduction axes, wherein introducing is rotationally asymmetrical about the longitudinal axis, and wherein the introduction axes and the longitudinal axis collectively extend in three dimensions;

passing the particles through an interrogation zone of the sample outlet channel;

irradiating the interrogation zone with light; and detecting optical radiation from the interrogation zone.

2. The method of claim 1, wherein each of the introduction axes is orthogonal to the longitudinal axis.

3. The method of claim 1, wherein introducing includes introducing the focusing fluid into the confluence region from each focusing channel at a respective flow rate that remains constant, regardless of the optical radiation detected.

4. The method of claim 1, wherein introducing includes introducing the focusing fluid into the confluence region at the same flow rate from each focusing channel.

5. The method of claim 1, further comprising transporting each of the particles to the same waste receptacle from the sample outlet channel, regardless of the optical radiation detected.

6. The method of claim 1, wherein introducing the focusing fluid concentrates the particles into a smaller particle localization zone within the sample outlet channel than would occur by introducing the focusing fluid in a rotationally symmetrical manner about the longitudinal axis, everything else being equal.

7. The method of claim 1, wherein an average position of the particles in the interrogation zone has a radial offset from the longitudinal axis in response to introducing the focusing fluid into the confluence region.

8. The method of claim 7, wherein the sample outlet channel has a radius at the interrogation zone, and wherein the radial offset is at least 10%, 15%, 20%, or 25% of the radius.

9. The method of claim 7, wherein irradiating is performed on an irradiation axis, and wherein the radial offset is in a direction that is within 20 degrees of orthogonal to the irradiation axis.

10. The method of claim 1, wherein driving includes driving the particles through a tapered region of the sample inlet channel that tapers toward the confluence region.

11. The method of claim 1, wherein introducing includes introducing the focusing fluid into the confluence region from the at least two focusing fluid channels through only two ports, and wherein the respective introduction axes are rotationally offset from one another about the longitudinal axis by 120 degrees or less.

12. The method of claim 11, wherein introducing includes introducing the focusing fluid into the confluence region from the at least two focusing channels through only three ports, and wherein the respective introduction axes are rotationally offset from one another by 100 degrees or less.

13. The method of claim 1, wherein the sample outlet channel has a channel diameter at the interrogation zone, and wherein the particles have an average particle diameter that is greater than 20% and less than 60% of the channel diameter.

14. The method of claim 1, wherein the particles are droplets.

15. The method of claim 1, wherein driving includes driving the sample fluid into the confluence region at a first volumetric flow rate, and wherein introducing includes introducing the focusing fluid into the confluence region at a second volumetric flow rate that is at least five times the first volumetric flow rate.

16. The method of claim 1, wherein introducing includes increasing an alignment of the particles with one another along the longitudinal axis.

17. The method of claim 1, wherein introducing includes increasing an average spacing of the particles from one another along the longitudinal axis.

18. The method of claim 1, wherein introducing includes introducing the focusing fluid into the confluence region at different flow rates from at least two of the focusing channels.

19. A method of detecting particles, the method comprising:

driving a sample fluid including the particles from a sample inlet channel, through a confluence region, and into a sample outlet channel defining a longitudinal axis;

introducing focusing fluid into the confluence region along two or more introduction axes that collectively have rotational asymmetry about the longitudinal axis;

passing the particles through an interrogation zone of the sample outlet channel;

irradiating the interrogation zone with light; and detecting optical radiation from the interrogation zone.

\* \* \* \* \*